US012794495B2

(12) United States Patent
Iwanaga

(10) Patent No.: US 12,794,495 B2
(45) Date of Patent: Nov. 10, 2026

(54) HIGH FREQUENCY CIRCUIT AND COMMUNICATION DEVICE

(71) Applicant: Murata Manufacturing Co., Ltd., Kyoto (JP)

(72) Inventor: Minoru Iwanaga, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 424 days.

(21) Appl. No.: 18/507,487

(22) Filed: Nov. 13, 2023

(65) Prior Publication Data

US 2024/0283469 A1 Aug. 22, 2024

(30) Foreign Application Priority Data

Feb. 22, 2023 (JP) ................................. 2023-026303

(51) Int. Cl.

| | |
|---|---|
| ***H04W 88/06*** | (2009.01) |
| ***H04B 1/00*** | (2006.01) |
| ***H04B 7/0413*** | (2017.01) |

(52) U.S. Cl.

CPC ......... *H04B 1/0057* (2013.01); *H04B 7/0413* (2013.01); *H04W 88/06* (2013.01)

(58) Field of Classification Search

CPC ........ H04B 1/0057; H04B 1/006; H04B 1/00; H04B 1/40; H04B 1/04; H04B 1/0064; H04B 7/0413; H04W 88/06

See application file for complete search history.

(56) References Cited

U.S. PATENT DOCUMENTS

| | | | | |
|---|---|---|---|---|
| 2015/0133067 | A1* | 5/2015 | Chang .................... | H04B 1/006 455/78 |
| 2020/0313714 | A1* | 10/2020 | Ono ....................... | H04B 1/006 |
| 2024/0097756 | A1* | 3/2024 | Pehlke ................. | H04B 1/1615 |
| 2024/0106618 | A1* | 3/2024 | Ashworth ............. | H04L 5/1469 |

FOREIGN PATENT DOCUMENTS

| | | |
|---|---|---|
| JP | 2020-167446 A | 10/2020 |

* cited by examiner

*Primary Examiner* — Marcus Hammonds

(74) *Attorney, Agent, or Firm* — McDonald Hopkins LLC

(57) ABSTRACT

A high frequency circuit includes a filter that has a passband including a reception band of a first band that can be used in a first region and a second region, a filter that has a passband including a reception band of a second band that can be used in the first region, a filter 330 that has a passband including the reception band of the first band, a filter that has a passband including a reception band of a third band that can be used in the second region, and a switch including a terminal connected to an antenna connection terminal, a terminal connected to an antenna connection terminal, a terminal connected to a plurality of filters including the filters and, and a terminal connected to a plurality of filters including the filters.

20 Claims, 15 Drawing Sheets

FOURTH MODE (FIRST REGION & SECOND REGION & THIRD REGION)

HIGH FREQUENCY CIRCUIT AND COMMUNICATION DEVICE

CROSS REFERENCE TO RELATED APPLICATION

This application claims priority from Japanese Patent Application No. 2023-026303 filed on Feb. 22, 2023. The content of this application is incorporated herein by reference in its entirety.

BACKGROUND ART

The present disclosure relates to a high frequency circuit and a communication device.

In mobile communication devices such as mobile phones, in order to improve data rates of wireless links, adoption of carrier aggregation (CA) and dual connectivity (DC), which use a plurality of frequency bands or channels simultaneously, has been in progress. For example, Patent Document 1 (Japanese Unexamined Patent Application Publication No. 2020-167446) discloses a high frequency circuit compatible with E-UTRAN New Radio-Dual Connectivity (EN-DC). Furthermore, support for multiple-input and multiple-output (MIMO) that realizes multi-pass transmission by using a plurality of antennae is also in progress.

BRIEF SUMMARY

However, with the technology of the related art described above, there are some cases in which noise figure (NF) may decrease due to adoption of CA, DC, and MIMO, or the like.

The present disclosure provides a high frequency circuit and a communication device that can improve the NF.

A high frequency circuit according to an aspect of the present disclosure includes: a first filter that has a passband including a reception band of a first band that is usable in a first region and a second region; a second filter that has a passband including a reception band of a second band that is usable in the first region; a third filter that has a passband including the reception band of the first band; a fourth filter that has a passband including a reception band of a third band that is usable in the second region; and a switch including a first terminal connected to a first antenna connection terminal, a second terminal connected to a second antenna connection terminal, a third terminal connected to a plurality of filters including the first filter and the second filter, and a fourth terminal connected to a plurality of filters including the third filter and the fourth filter. The high frequency circuit has a first mode in which in the first region, the first terminal or the second terminal is connected to the third terminal to simultaneously receive signals of the first band and the second band, a second mode in which in the second region, the first terminal or the second terminal is connected to the fourth terminal to simultaneously receive signals of the first band and the third band, and a third mode in which in the first region and the second region, the first terminal and the second terminal are connected to the third terminal and the fourth terminal, respectively, to simultaneously receive two signals of the first band.

A high frequency circuit according to an aspect of the present disclosure includes: a first filter that has a passband including a reception band of a first band that is usable in a first region, a second region, and a third region; a second filter that has a passband including a reception band of a second band that is usable in the first region; a third filter that has a passband including the reception band of the first band;

a fourth filter that has a passband including a reception band of a third band that is usable in the second region; a fifth filter that has a passband including a reception band of a fifth band that is usable in the first region and the third region; a sixth filter that has a passband including a reception band of a fourth band that is usable in the third region; a first switch including a first terminal connected to a first antenna connection terminal, a second terminal connected to a second antenna connection terminal, a third terminal connected to the second filter, a fourth terminal connected to the third filter and the fourth filter, a fifth terminal connected to the sixth filter, and a sixth terminal selectively connected to the first filter and the fifth filter; and a second switch including a seventh terminal connected to the sixth terminal of the first switch, an eighth terminal connected to the first filter, and a ninth terminal connected to the fifth filter. The high frequency circuit has a first mode in which in the first region, the first terminal and the second terminal are connected to the third terminal and the sixth terminal, respectively, and the seventh terminal is connected to the eighth terminal to simultaneously receive signals of the first band and the second band, a second mode in which in the second region, the first terminal or the second terminal is connected to the fourth terminal to simultaneously receive signals of the first band and the third band, a third mode in which in the third region, the first terminal and the second terminal are connected to the fifth terminal and the sixth terminal, respectively, and the seventh terminal is connected to the eighth terminal to simultaneously receive signals of the first band and the fourth band, a fourth mode in which in the first region, the second region, and the third region, the first terminal and the second terminal are connected to the fourth terminal and the sixth terminal, respectively, and the seventh terminal is connected to the eighth terminal to simultaneously receive two signals of the first band, a fifth mode in which in the first region, the first terminal and the second terminal are connected to the third terminal and the sixth terminal, respectively, and the seventh terminal is connected to the ninth terminal to simultaneously receive signals of the second band and the fifth band, and a sixth mode in which in the third region, the first terminal and the second terminal are connected to the fifth terminal and the sixth terminal, respectively, and the seventh terminal is connected to the ninth terminal to simultaneously receive signals of the fourth band and the fifth band.

A communication device according to an aspect of the present disclosure includes: a signal processing circuit configured to process high frequency signals; and the high frequency circuit configured to transmit high frequency signals between the signal processing circuit and an antenna.

According to the high frequency circuit and the communication device according to an embodiment of the present disclosure, it is possible to improve the NF.

DETAILED DESCRIPTION

Figure 1:
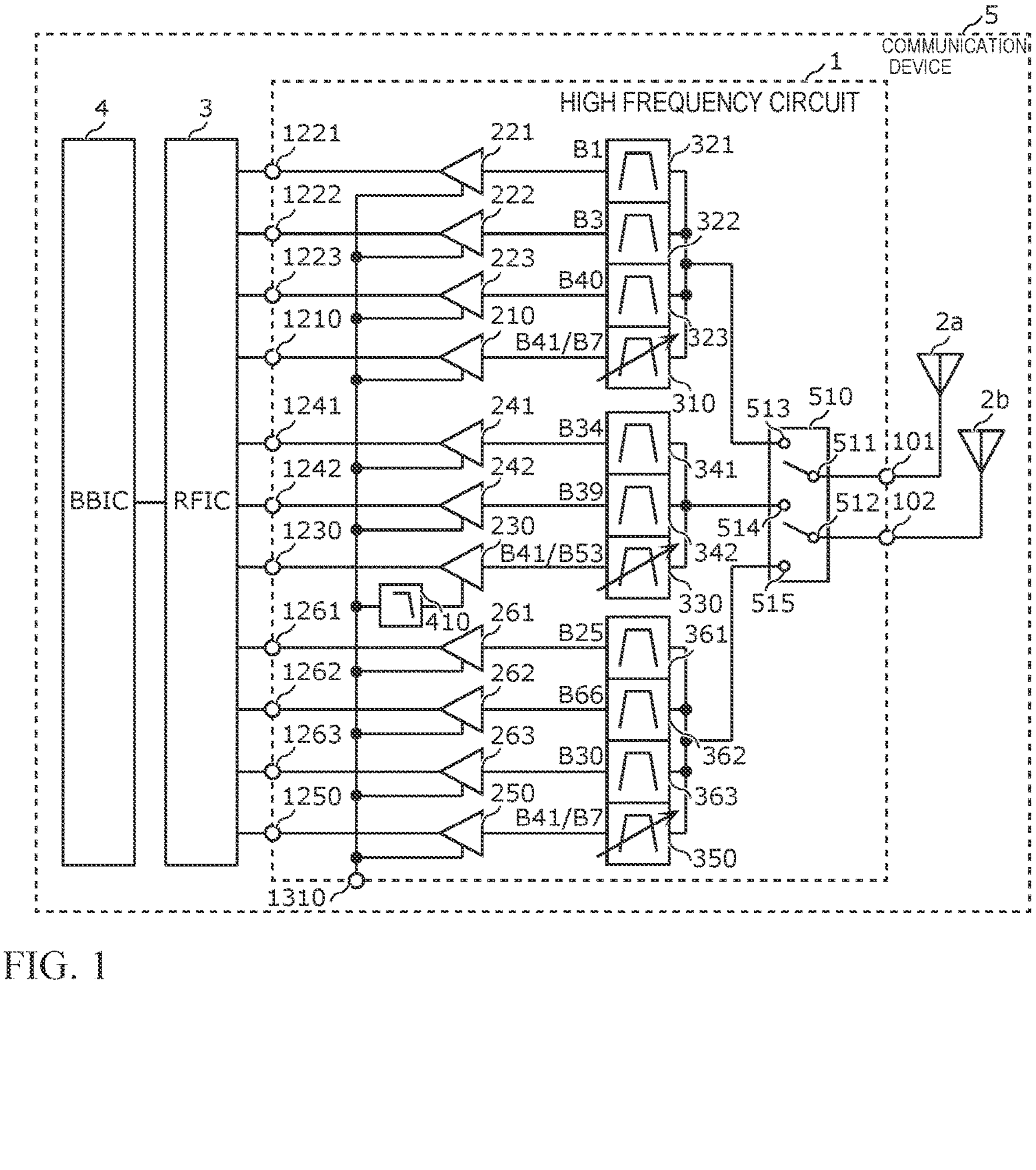
FIG. 1 is a circuit configuration diagram of a communication device according to Embodiment 1.

In the following, embodiments of the present disclosure are described in detail with reference to the drawings. Note that the embodiments to be described below all illustrate comprehensive or specific examples. Numeric values, shapes, materials, components, arrangement and connection form of the components stated in the embodiments to be described below are merely examples, and not intended to limit the present disclosure.

Note that each figure is a schematic diagram in which emphasis, omission, or adjustment of a proportion has been done as appropriate to illustrate the present disclosure, and is not necessarily depicted in a strict manner and may differ from actual shapes, positional relations, and proportions. In each figure, identical reference numerals are assigned to substantially identical configurations, and an overlapping description may be omitted or simplified.

In a circuit configuration, "connected" not only includes a case of direct connection with a connection terminal and/or a wiring semiconductor, but also a case of electrical connection via another circuit element. "C is connected between A and B" means that one end of C is connected to A and another end of C is connected to B, meaning serial connection to a path connecting A and B.

A "passband of a filter" is a portion of a frequency spectrum to be transmitted by a filter, and is defined as a frequency band in which output power is not attenuated by 3 dB or more below maximum output power. Therefore, A higher region end and lower region end of a band pass filter are identified as a higher frequency and a lower frequency of two points where the output power is attenuated by 3 dB or more below the maximum output power.

A "reception band" means a frequency band used for reception in a communication device. For example, in frequency division duplex (FDD), mutually different frequency bands are used as a transmission band and a reception band. In time division duplex (TDD), a same frequency band is used as the transmission band and the reception band. In FDD, in particular, if a communication device is implemented in user equipment (UE) of a cellular network, an uplink band (uplink operation band) is used as the transmission band, and a downlink band (downlink operation band) is used as the reception band. To the contrary, if the communication device is implemented as a base station (BS) of the cellular network, the downlink band is used as the transmission band, and the uplink band is used as the reception band.

Embodiment 1

In the following, Embodiment 1 is described.

[1.1 Circuit Configuration of Communication Device 5]

First, a circuit configuration of a communication device 5 according to the present embodiment is described with reference to FIG. 1. FIG. 1 is a circuit configuration diagram of the communication device 5 according to the present embodiment. In FIG. 1, numbers assigned with B written next to filters represent numbers that identify frequency bands of LTE and/or 5G NR. For example, "B1" represents Band1 for LTE and n1 for 5G NR. Note that frequency bands illustrated in FIG. 1 are illustrations for facilitating understanding of those skilled in the art, and the frequency bands corresponding to respective filters are not limited to those described in FIG. 1.

Note that FIG. 1 illustrates an exemplary circuit configuration of the communication device 5 and a high frequency circuit 1. The communication device 5 and the high frequency circuit 1 may be implemented by using any of a variety of circuit implementations and circuit techniques. Therefore, a description of the communication device 5 and the high frequency circuit 1 provided below should not be interpreted in a limiting manner.

The communication device 5 is implemented in UE of the cellular network, and is typically a mobile phone, a smartphone, a tablet computer, a wearable device, or the like. Note that the communication device 5 may be an IoT (Internet of Things) sensor/device, a medical/health care device, a car, an unmanned aerial vehicle (UAV) (so-called drone), or an automated guided vehicle (AGV). In addition, the communication device 5 may be implemented in a BS of a cellular communication system.

As illustrated in FIG. 1, the communication device 5 includes the high frequency circuit 1, antennae 2*a* and 2*b*, a radio frequency integrated circuit (RFIC) 3, and a baseband integrated circuit (BBIC) 4.

The high frequency circuit 1 can transmit a high frequency signal between the antennae 2*a* and 2*b* and the RFIC 3. An internal configuration of the high frequency circuit 1 is described below.

The antennae 2*a* and 2*b* are connected to antenna connection terminals 101 and 102 of the high frequency circuit 1, respectively. The antennae 2*a* and 2*b* can receive a high frequency signal from outside of the communication device 5 and supply the high frequency signal to the high frequency circuit 1. Furthermore, the antennae 2*a* and 2*b* may transmit the high frequency signal supplied from the high frequency circuit 1 to the outside of the communication device 5. Note that the antennae 2*a* and/or 2*b* may not have to be included in the communication device 5. In addition, the communication device 5 may further include one or more antennae, in addition to the antennae 2*a* and 2*b*.

The RFIC 3 is an example of a signal processing circuit that processes high frequency signals. Specifically, the RFIC 3 can perform signal processing of a high frequency received signal inputted through a reception path of the high frequency circuit 1 by down-conversion, or the like, and output the received signal generated by the signal processing to the BBIC 4. Furthermore, the RFIC 3 may perform signal processing of a transmission signal inputted from the BBIC 4 by up-conversion, or the like, and output the high-frequency transmission signal generated by the signal processing to the high frequency circuit 1. In addition, the RFIC 3 may include a control section for controlling a switch or a power amplifier possessed by the high frequency circuit 1. Note that some or all of the control section may be provided outside the RFIC 3, and may be included in the BBIC 4 or the high frequency circuit 1, for example.

The BBIC 4 is a baseband signal processing circuit that performs signal processing using a frequency band of lower frequencies than the high frequency signal transmitted by the high frequency circuit 1. As signals to be processed by the BBIC 4, for example, image signals for image display and/or audio signals for conversation via a speaker are used. Note that the BBIC 4 may not have to be included in the communication device 5.

1.2 Circuit Configuration of High Frequency Circuit 1

In the following, a circuit configuration of the high frequency circuit 1 according to the present embodiment is described with reference to FIG. 1. The high frequency circuit 1 includes antenna connection terminals 101 and 102, low noise amplifiers 210, 221 to 223, 230, 241, 242, 250, and 261 to 263, filters 310, 321 to 323, 330, 341, 342, 350, and 361 to 363, a low pass filter 410, a switch 510, high frequency output terminals 1210, 1221 to 1223, 1230, 1241, 1242, 1250, and 1261 to 1263, and a power supply voltage terminal 1310.

The antenna connection terminals 101 and 102 are examples of the first antenna terminal and the second antenna terminal, respectively, and are external connection terminals of the high frequency circuit 1. The antenna connection terminals 101 and 102 are connected to the antennae 2*a* and 2*b*, respectively, outside the high frequency circuit 1, and connected to the switch 510 inside the high frequency circuit 1. This enables the high frequency circuit 1 to receive received signals from the antennae 2*a* and 2*b* via the antenna connection terminals 101 and 102.

The low noise amplifier 210 is an example of a first low noise amplifier, is connected between the filter 310 and the high frequency output terminal 1210, and is further connected to the power supply voltage terminal 1310. Specifically, an input end of the low noise amplifier 210 is connected to the filter 310, and an output end of the low noise amplifier 210 is connected to the high frequency output terminal 1210 and the power supply voltage terminal 1310. Using a supply voltage supplied via the power supply voltage terminal 1310, the low noise amplifier 210 can amplify of a first band received signal and a fifth band received signal received via the filter 310. Note that the low noise amplifier 210 may not have to be included in the high frequency circuit 1. For example, the low noise amplifier 210 may be connected between the high frequency circuit 1 and the RFIC 3, and may be included in the RFIC 3.

The low noise amplifier 221 is connected between the filter 321 and the high frequency output terminal 1221, and further connected to the power supply voltage terminal 1310. Specifically, an input end of the low noise amplifier 221 is connected to the filter 321, and an output end of the low noise amplifier 221 is connected to the high frequency output terminal 1221 and the power supply voltage terminal 1310. Using the supply voltage supplied via the power supply voltage terminal 1310, the low noise amplifier 221 can amplify a second band received signal received via the filter 321. Note that the low noise amplifier 221 may not have to be included in the high frequency circuit 1. For example, the low noise amplifier 221 may be connected between the high frequency circuit 1 and the RFIC 3, and may be included in the RFIC 3.

The low noise amplifier 222 is connected between the filter 322 and the high frequency output terminal 1222, and further connected to the power supply voltage terminal 1310. Specifically, an input end of the low noise amplifier 222 is connected to the filter 322, and an output end of the low noise amplifier 222 is connected to the high frequency output terminal 1222 and the power supply voltage terminal 1310. Using the supply voltage supplied via the power supply voltage terminal 1310, the low noise amplifier 222 can amplify the second band received signal received via the filter 322. Note that the low noise amplifier 222 may not have to be included in the high frequency circuit 1. For example, the low noise amplifier 222 may be connected between the high frequency circuit 1 and the RFIC 3, and may be included in the RFIC 3.

The low noise amplifier 223 is connected between the filter 323 and the high frequency output terminal 1223, and further connected to the power supply voltage terminal 1310. Specifically, an input end of the low noise amplifier 223 is connected to the filter 323, and an output end of the low noise amplifier 223 is connected to the high frequency output terminal 1223 and the power supply voltage terminal 1310. Using the supply voltage supplied via the power supply voltage terminal 1310, the low noise amplifier 223 can amplify the second band received signal received via the filter 323. Note that the low noise amplifier 223 may not have to be included in the high frequency circuit 1. For example, the low noise amplifier 223 may be connected between the high frequency circuit 1 and the RFIC 3, and may be included in the RFIC 3.

The low noise amplifier 230 is an example of a second low noise amplifier, is connected between the filter 330 and the high frequency output terminal 1230, and is further connected to the power supply voltage terminal 1310. Specifically, an input end of the low noise amplifier 230 is connected to the filter 330, and an output end of the low noise amplifier 230 is connected to the high frequency output terminal 1230 and the power supply voltage terminal 1310. Using the supply voltage supplied via the power supply voltage terminal 1310, the low noise amplifier 230 can amplify the first band received signal and a sixth band received signal received via the filter 330. Note that the low noise amplifier 230 may not have to be included in the high frequency circuit 1. For example, the low noise amplifier 230 may be connected between the high frequency circuit 1 and the RFIC 3, and may be included in the RFIC 3.

The low noise amplifier 241 is connected between the filter 341 and the high frequency output terminal 1241, and further connected to the power supply voltage terminal 1310. Specifically, an input end of the low noise amplifier 241 is connected to the filter 341, and an output end of the low noise amplifier 241 is connected to the high frequency output terminal 1241 and the power supply voltage terminal 1310. Using the supply voltage supplied via the power supply voltage terminal 1310, the low noise amplifier 241 can amplify a third band received signal received via the filter 341. Note that the low noise amplifier 241 may not have to be included in the high frequency circuit 1. For example, the low noise amplifier 241 may be connected between the high frequency circuit 1 and the RFIC 3, and may be included in the RFIC 3.

The low noise amplifier 242 is connected between the filter 342 and the high frequency output terminal 1242, and further connected to the power supply voltage terminal 1310. Specifically, an input end of the low noise amplifier 242 is connected to the filter 342, and an output end of the low noise amplifier 242 is connected to the high frequency output terminal 1242 and the power supply voltage terminal 1310. Using the supply voltage supplied via the power supply voltage terminal 1310, the low noise amplifier 242 can amplify the third band received signal received via the filter 342. Note that the low noise amplifier 242 may not have to be included in the high frequency circuit 1. For example, the low noise amplifier 242 may be connected between the high frequency circuit 1 and the RFIC 3, and may be included in the RFIC 3.

The low noise amplifier 250 is connected between the filter 350 and the high frequency output terminal 1250, and further connected to the power supply voltage terminal 1310. Specifically, an input end of the low noise amplifier 250 is connected to the filter 350, and an output end of the low noise amplifier 250 is connected to the high frequency output terminal 1250 and the power supply voltage terminal 1310. Using the supply voltage supplied via the power supply voltage terminal 1310, the low noise amplifier 250 can amplify the first band received signal and the fifth band received signal received via the filter 350. Note that the low noise amplifier 250 may not have to be included in the high frequency circuit 1. For example, the low noise amplifier 250 may be connected between the high frequency circuit 1 and the RFIC 3, and may be included in the RFIC 3.

The low noise amplifier 261 is connected between the filter 361 and the high frequency output terminal 1261, and further connected to the power supply voltage terminal 1310. Specifically, an input end of the low noise amplifier 261 is connected to the filter 361, and an output end of the low noise amplifier 261 is connected to the high frequency output terminal 1261 and the power supply voltage terminal 1310. Using the supply voltage supplied via the power supply voltage terminal 1310, the low noise amplifier 261 can amplify a fourth band received signal received via the filter 361. Note that the low noise amplifier 261 may not have to be included in the high frequency circuit 1. For example, the low noise amplifier 261 may be connected between the high frequency circuit 1 and the RFIC 3, and may be included in the RFIC 3.

The low noise amplifier 262 is connected between the filter 362 and the high frequency output terminal 1262, and further connected to the power supply voltage terminal 1310. Specifically, an input end of the low noise amplifier 262 is connected to the filter 362, and an output end of the low noise amplifier 262 is connected to the high frequency output terminal 1262 and the power supply voltage terminal 1310. Using the supply voltage supplied via the power supply voltage terminal 1310, the low noise amplifier 262 can amplify the fourth band received signal received via the filter 362. Note that the low noise amplifier 262 may not have to be included in the high frequency circuit 1. For example, the low noise amplifier 262 may be connected between the high frequency circuit 1 and the RFIC 3, and may be included in the RFIC 3.

The low noise amplifier 263 is connected between the filter 363 and the high frequency output terminal 1263, and further connected to the power supply voltage terminal 1310. Specifically, an input end of the low noise amplifier 263 is connected to the filter 363, and an output end of the low noise amplifier 263 is connected to the high frequency output terminal 1263 and the power supply voltage terminal 1310. Using the supply voltage supplied via the power supply voltage terminal 1310, the low noise amplifier 263 can amplify the fourth band received signal received via the filter 363. Note that the low noise amplifier 263 may not have to be included in the high frequency circuit 1. For example, the low noise amplifier 263 may be connected between the high frequency circuit 1 and the RFIC 3, and may be included in the RFIC 3.

Such low noise amplifiers 210, 221 to 223, 230, 241, 242, 250, and 261 to 263 can include an electric field effect transistor (FET), and can be manufactured using semiconductor materials. For example, a silicon single crystal, gallium nitride (GaN), or silicon carbide (SiC) can be used as the semiconductor materials. Note that amplification transistors for the low noise amplifiers 210, 221 to 223, 230, 241, 242, 250, and 261 to 263 are not limited to FET. For example, some or all of the low noise amplifiers 210, 221 to 223, 230, 241, 242, 250, and 261 to 263 may include bipolar transistors.

The filter 310 is an example of a first filter, and is the band pass filter adjustable to the passband including a first-band reception band that can be used in a first region, a second region, and a third region as well as to the passband including a fifth-band reception band. The filter 310 is connected between the switch 510 and the low noise amplifier 210. Specifically, one end of the filter 310 is connected to a terminal 513 of the switch 510, and the other end of the filter 310 is connected to the input end of the low noise amplifier 210. Note that the filter 310 may not have to be adjusted to the passband including the fifth band reception band. That is, the filter 310 may not have to be an adjustable filter, and may be the band pass filter that has the passband including the first-band reception band.

Each of the filters 321 to 323 is an example of a second filter, and is a band pass filter that has the passband including a second band reception band that can be used in the first region. The filter 321 is connected between the switch 510 and the low noise amplifier 221. Specifically, one end of the filter 321 is connected to the terminal 513 of the switch 510, and the other end of the filter 321 is connected to the input end of the low noise amplifier 221. The filter 322 is connected between the switch 510 and the low noise amplifier 222. Specifically, one end of the filter 322 is connected to the terminal 513 of the switch 510, and the other end of the filter 322 is connected to the input end of the low noise amplifier 222. The filter 323 is connected between the switch 510 and the low noise amplifier 223. Specifically, one end of the filter 323 is connected to the terminal 513 of the switch 510, and the other end of the filter 323 is connected to the input end of the low noise amplifier 223. Note that one or two of the filters 321 to 323 may not have to be included in the high frequency circuit 1. That is, at least one of the filters 321 to 323 may be included in the high frequency circuit 1.

The filter 330 is an example of a third filter, and is a band pass filter adjustable to the passband including the reception band of the first band that can be used in the first region, the second region, and the third region, and to the passband including a sixth band reception band. The filter 330 is connected between the switch 510 and the low noise amplifier 230. Specifically, one end of the filter 330 is connected to a terminal 514 of the switch 510, and the other end of the filter 330 is connected to the input end of the low noise amplifier 230. Note that the filter 330 may not have to be adjusted to the passband including the sixth band reception band. That is, the filter 330 may not have to be the adjustable filter, and may be the band pass filter that has the passband including the first band reception band.

Each of the filter 341 and 342 is an example of a fourth filter, and is a band pass filter that has the passband including the reception band of the third band that can be used in the second region. The filter 341 is connected between the switch 510 and the low noise amplifier 241. Specifically, one end of the filter 341 is connected to the terminal 514 of the switch 510, and the other end of the filter 341 is connected to the input end of the low noise amplifier 241. The filter 342 is connected between the switch 510 and the low noise amplifier 242. Specifically, one end of the filter 342 is connected to the terminal 514 of the switch 510, and the other end of the filter 342 is connected to the input end of the low noise amplifier 242. Note that one of the filters 341 and 342 may not have to be included in the high frequency circuit 1. That is, at least one of the filters 341 or 342 may be included in the high frequency circuit 1.

The filter 350 is an example of a fifth filter, and is a band pass filter adjustable to the passband including the reception band of the first band that can be used in the first region, the second region, and the third region, and the passband including the fifth band reception band. The filter 350 is connected between the switch 510 and the low noise amplifier 250. Specifically, one end of the filter 350 is connected to a terminal 515 of the switch 510, and the other end of the filter 350 is connected to the input end of the low noise amplifier 250. Note that the filter 350 may not have to be adjusted to the passband including the fifth band reception band. That is, the filter 350 may not have to be the adjustable filter, and may be the band pass filter that has the passband including the first band reception band. In addition, the filter 350 may not be included in the high frequency circuit 1.

Each of the filters 361 to 363 is an example of a sixth filter, and is a band pass filter that has the passband including the reception band of the fourth band that can be used in the third region. The filter 361 is connected between the switch 510 and the low noise amplifier 261. Specifically, one end of the filter 361 is connected to the terminal 515 of the switch 510, and the other end of the filter 361 is connected to the input end of the low noise amplifier 261. The filter 362 is connected between the switch 510 and the low noise amplifier 262.

Specifically, one end of the filter 362 is connected to the terminal 515 of the switch 510, and the other end of the filter 362 is connected to the input end of the low noise amplifier 262. The filter 363 is connected between the switch 510 and the low noise amplifier 263. Specifically, one end of the filter 363 is connected to the terminal 515 of the switch 510, and the other end of the filter 363 is connected to the input end of the low noise amplifier 263. Note that some or all of the filters 361 to 363 may not have to be included in the high frequency circuit 1.

As described above, the filters 310 and 321 to 323 for the bands that can be used in the first region are connected in a bundle to the terminal 513 of the switch 510. The filters 330, 341, and 342 for the bands that can be used in the second region are connected in a bundle to the terminal 514 of the switch 510. The filters 350 and 361 to 363 for the bands that can be used in the third region are connected in a bundle to the terminal 515 of the switch 510.

As such filters 310, 321 to 323, 330, 341, 342, 350, 361 to 363, a surface acoustic wave (SAW) filter, a bulk acoustic wave (BAW) filter, an LC resonant filter, or a dielectric resonant filter, or any combination thereof may be used, and, furthermore, the filters are not limited thereto. Note that when the filters 310, 330, and 350 are acoustic wave filters, any combination of the filters 310, 330, and 350 can be mounted in or on the same piezoelectric body. For example, a single crystal of lithium tantalate ($LiTaO_3$), lithium niobate ($LiNbO_3$), aluminum nitride (AlN), or zinc oxide (ZnO) or ceramics can be used as the piezoelectric body.

The low pass filter 410 is connected between the low noise amplifier 230 and the power supply voltage terminal 1310. The low pass filter 410 can attenuate a first band signal, and can suppress leakage of the first band signal via a supply path of a supply voltage that connects the low noise amplifiers 210 and/or 250 and the low noise amplifier 230. An LC filter can be used as the low pass filter 410, but is not limited thereto.

The switch 510 is connected between the antenna connection terminals 101 and 102 and the filters 310, 321 to 323, 330, 341, 342, 350, and 361 to 363. Specifically, the switch 510 includes the terminals 511 to 515. The terminal 511 is an example of a first terminal and connected to the antenna connection terminal 101. The terminal 512 is an example of a second terminal and connected to the antenna connection terminal 102. The terminal 513 is an example of a third terminal and connected to the filters 310 and 321 to 323. The terminal 514 is an example of a fourth terminal and connected to the filters 330, 341, and 342. The terminal 515 is an example of a fifth terminal and connected to the filters 350 and 361 to 363.

In such a connection configuration, the switch 510 can connect the terminals 511 and 512 to the terminals 513 to 515 based on a control signal from the RFIC 3, for example. That is, the switch 510 can switch between connecting only one of the terminals 511 and 512 to any of the terminals 513 to 515 and connecting the terminals 511 and 512 to any two of the terminals 513 to 515. The switch 510 includes, for example, a multi-connection type switch circuit.

The high frequency output terminals 1210, 1221 to 1223, 1230, 1241, 1242, 1250, and 1261 to 1263 are the external connection terminals of the high frequency circuit 1. The high frequency output terminals 1210, 1221 to 1223, 1230, 1241, 1242, 1250, and 1261 to 1263 are connected to the RFIC 3 outside the high frequency circuit 1, and connected to the low noise amplifiers 210, 221 to 223, 230, 241, 242, 250, and 261 to 263, respectively inside the high frequency circuit 1. This enables the high frequency circuit 1 to supply received signals to the RFIC 3 via the high frequency output terminals 1210, 1221 to 1223, 1230, 1241, 1242, 1250, and 1261 to 1263.

The power supply voltage terminal 1310 is the external connection terminal of the high frequency circuit 1. The power supply voltage terminal 1310 is connected to a direct current power supply (not illustrated) outside the high frequency circuit 1, and connected to the low noise amplifiers 210, 221 to 223, 230, 241, 242, 250, and 261 to 263 inside the high frequency circuit 1. This enables the high frequency circuit 1 to receive, via the power supply voltage terminal 1310, the supply voltage to be used for amplification of received signals in the low noise amplifiers 210, 221 to 223, 230, 241, 242, 250, and 261 to 263.

1.3 Frequency Band

Here, frequency bands that can be used in the communication device 5 according to the present embodiment are described.

The first band to the sixth bands are frequency bands for a communication system that is built using a radio access technology (RAT), and defined in advance by standardization organizations (for example, 3rd Generation Partnership Project (3GPP®) and Institute of Electrical and Electronics Engineers (IEEE), or the like). Examples of the communication systems can include 5th Generation New Radio (5G NR) systems, Long Term Evolution (LTE) systems, and Wireless Local Area Network (WLAN) systems.

The first region, the second region, and the third regions are mutually different geographical areas. If a band can be used in a region, it means that use of the band is permitted and not prohibited in the region.

The first band is a frequency band that can be used in the first region, the second region, and the third region. Band 41 for LTE or n41 for 5G NR can be used as the first band, but the first band is not limited thereto.

The second band is a frequency band that can be used in the first region. In the present embodiment, a combination of the first band and the second band is a band combination that can be received simultaneously. If the first region is Europe, as the second band, Band1, Band3 or Band 40 for LTE or n1, n3, or n40 for 5G NR can be used. Note that the first region is not limited to Europe, and the second band is not limited to these bands.

The third band is a frequency band that can be used in the second region. In the present embodiment, a combination of the first band and the third band is the band combination that can be received simultaneously. If the second region is China, as the third band, Band34 or Band39 for LTE or n34 or n39 for 5G NR can be used. Note that the second band is not limited to China, and the third band is not limited to these bands.

The fourth band is a frequency band that can be used in the third region. In the present embodiment, a combination of the first band and the fourth band is the band combination that can be received simultaneously. If the third region is the United States, as the fourth band, Band25, Band30, or Band66 for LTE or n25, N30, or n66 for 5G NR can be used. Note that the third band is not limited to the United States, and the fourth band is not limited to these bands.

The fifth band is a frequency band that can be used in the first region and the third region. In the present embodiment, a combination of the second band and the fifth band and a combination of the fourth band and the fifth band are the band combinations that can be received simultaneously. If the first region is Europe and the third region is the United States, as the fifth band, Band7 for LTE or n7 for 5G NR can be used. Note that the first band the third band are not limited to Europe and the United States, and the fifth band is not limited to these bands.

The sixth band is a frequency band that can be used in the second region. If the second region is China, as the sixth band, Band53 for LTE or n53 for 5G NR can be used. Note that the second region is not limited to China, and the sixth band is not limited to these bands.

Note that the band combinations that can be received simultaneously are defined in advance by the standardization organizations, or the like. The band combinations that can be received simultaneously are defined as, for examples, a band combination for Ca, EN-DC, New Radio-Dual Connectivity (NR-DC) or New Radio E-UTRAN-Dual Connectivity (NE-DC).

Table 1 below summarizes a relationship between the above bands and the regions where the bands are used. Cells marked with circle in Table 1 mean that a band in a corresponding row can be used in a region in a corresponding column. Note that cells marked with no circle mean that the band in the corresponding row cannot be used in the region in the corresponding column. For example, the second band may be usable in the second region and/or the third region.

TABLE 1

| | First region (e.g., EU) | Second region (e.g., CN) | Third region (e.g., US) |
|---|---|---|---|
| First band (e.g., B41) | ○ | ○ | ○ |
| Second band (e.g., B1/B3/B40) | ○ | | |
| Third band (e.g., B34/B39) | | ○ | |
| Fourth band (e.g., B25/B30/B60) | | | ○ |
| Fifth band (e.g., B7) | ○ | | ○ |
| Sixth band (e.g., B53) | | ○ | |

1.4 Communication Modes

In the following, communication modes of the high frequency circuit 1 according to the present embodiment for simultaneously receiving two high frequency signals are described.

1.4.1 First Mode

Figure 2:
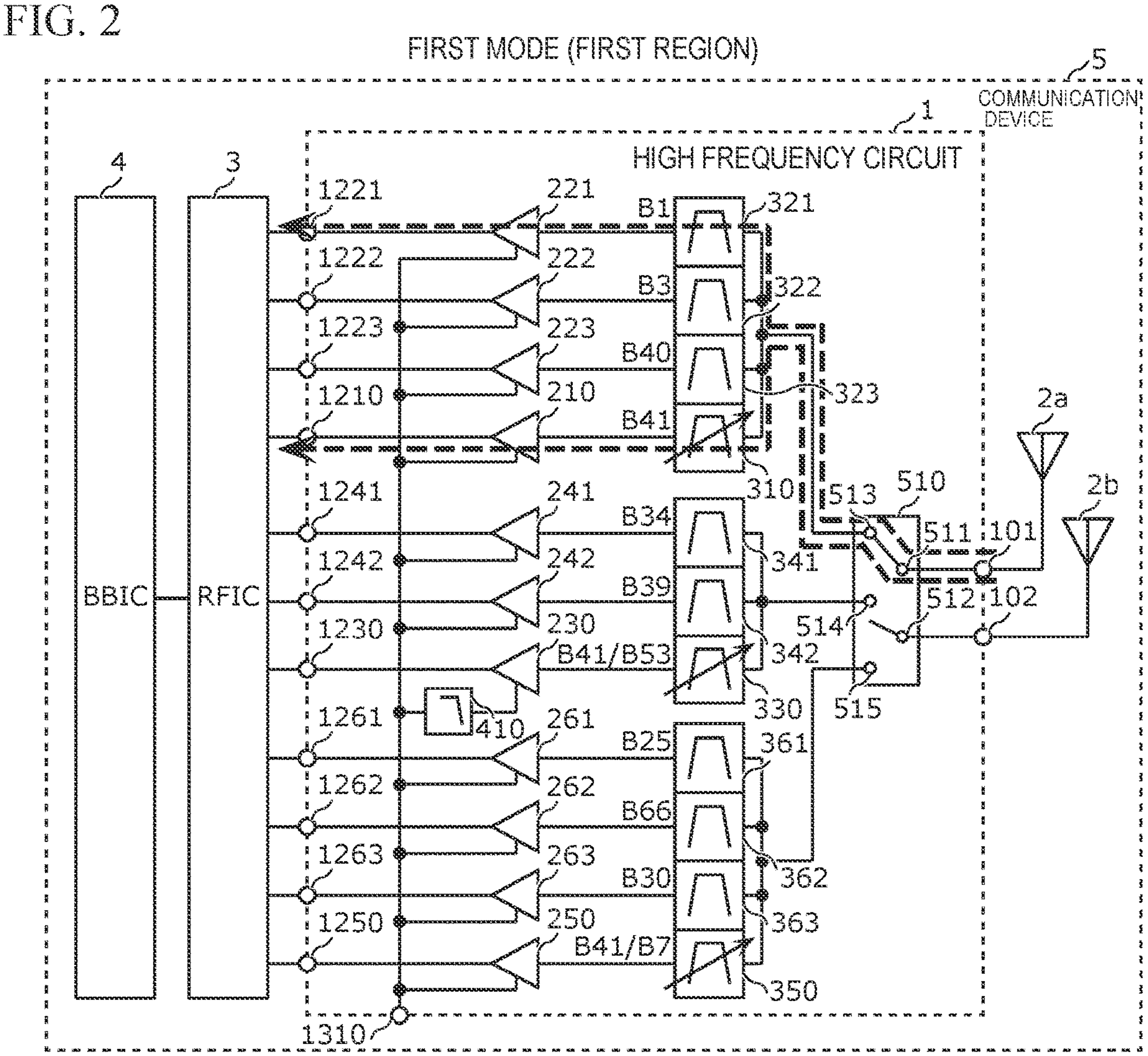
FIG. 2 is a diagram illustrating a connection state and flow of a high frequency signal of a high frequency circuit in a first mode according to Embodiment 1.

First, a first mode is descried with reference to FIG. 2. FIG. 2 is a diagram illustrating a connection state and flow of a high frequency signal of the high frequency circuit 1 in the first mode according to the present embodiment. In FIG. 2, dashed arrows represent flow of received signals.

The first mode is a communication mode for simultaneously receiving signals of the first band (B41) and the second band (B1) in the first region. As illustrated in FIG. 2, the switch 510 connects the terminal 511 to the terminal 513. This connects the filters 310 and 321 to 323 to the antenna connection terminal 101. At this time, the filter 310 is adjusted to the passband including the first band.

As a result, a first band received signal is transmitted from the antenna 2*a* to the RFIC 3 via the antenna connection terminal 101, the switch 510, the filter 310, the low noise amplifier 210, and the high frequency output terminal 1210. The second band received signal is transmitted from the antenna 2*a* to the RFIC 3 via the antenna connection terminal 101, the switch 510, the filter 321, the low noise amplifier 221, and the high frequency output terminal 1221.

Note that in FIG. 2, instead of signals of Band1 for LTE and n1 for 5G NR, signals of Band3 or Band40 for LTE or n3 or n40 for 5G NR may be received. In addition, instead of the terminal 511, the terminal 512 may be connected to the terminal 513. In this case, the first band received signal and second band received signal are transmitted from the antenna 2*b* to the RFIC 3 via the antenna connection terminal 102, in a similar manner as described above.

1.4.2 Second Mode

Figure 3:
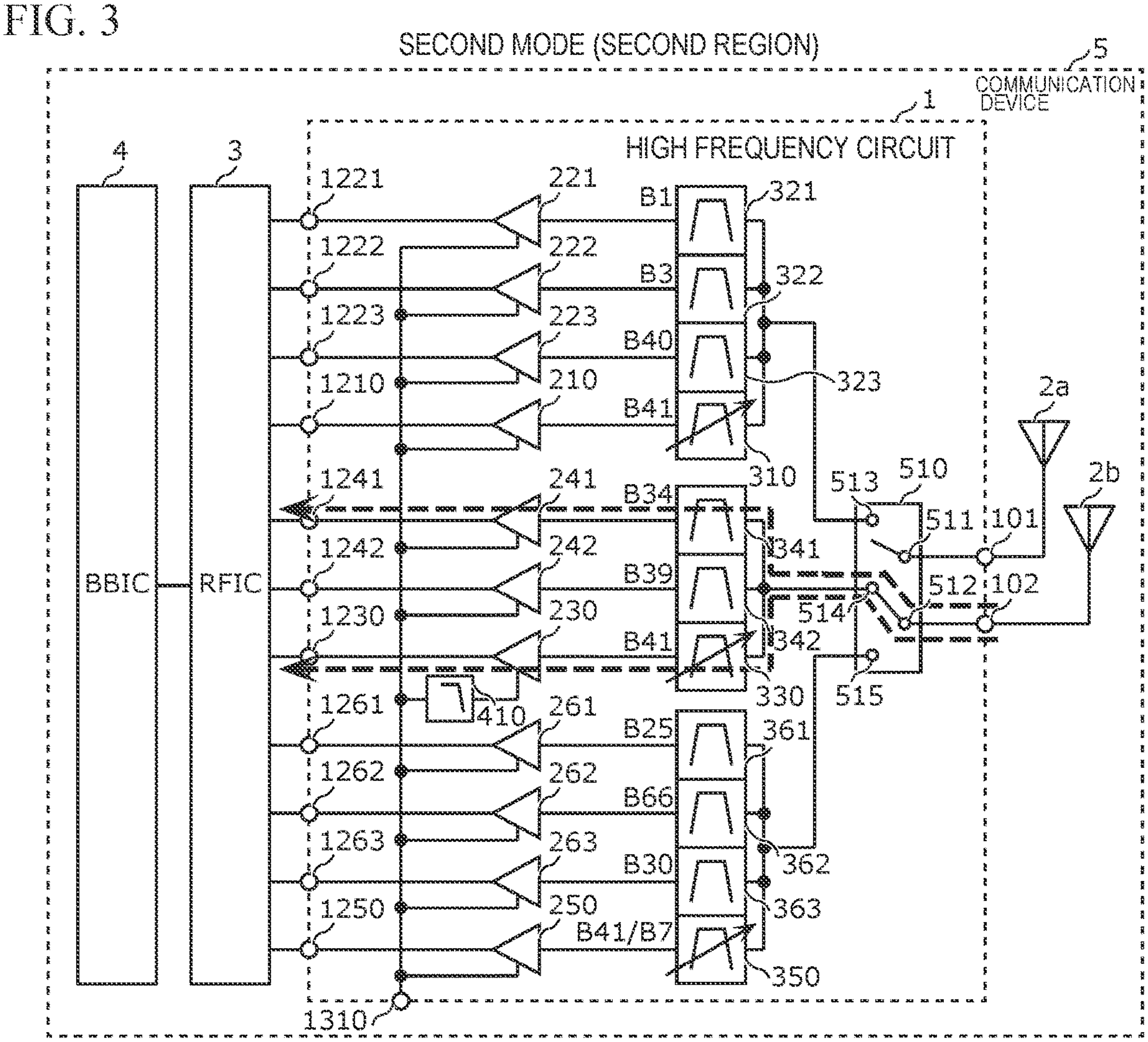
FIG. 3 is a diagram illustrating a connection state and flow of a high frequency signal of the high frequency circuit in a second mode according to Embodiment 1.

In the following, a second mode is described with reference to FIG. 3. FIG. 3 is a diagram illustrating a connection state and flow of a high frequency signal of the high frequency circuit 1 in the second mode according to the present embodiment. In FIG. 3, the dashed arrows represent the flow of the received signals.

The second mode is a communication mode for simultaneously receiving signals of the first band (B41) and the third band (B34) in the second region. As illustrated in FIG. 3, the switch 510 connects the terminal 512 to the terminal 514. This connects the filters 330, 341, and 342 to the antenna connection terminal 102. At this time, the filter 330 is adjusted to the passband including the first band.

As a result, the first band received signal is transmitted from the antenna 2*b* to the RFIC 3 via the antenna connection terminal 102, the switch 510, the filter 330, the low noise amplifier 230, and the high frequency output terminal 1230. The third band received signal is transmitted from the antenna 2*b* to the RFIC 3 via the antenna connection terminal 102, the switch 510, the filter 341, the low noise amplifier 241, and the high frequency output terminal 1241.

Note that in FIG. 3, instead of signals of Band34 for LTE and n34 for 5G NR, signals of Band39 for LTE or n39 for 5G NR may be received. In addition, instead of the terminal 512, the terminal 511 may be connected to the terminal 514. In this case, the first band received signal and the third band received signal are transmitted from the antenna 2*a* to the RFIC 3 via the antenna connection terminal 101, in a similar manner as described above.

1.4.3 Third Mode

Figure 4:
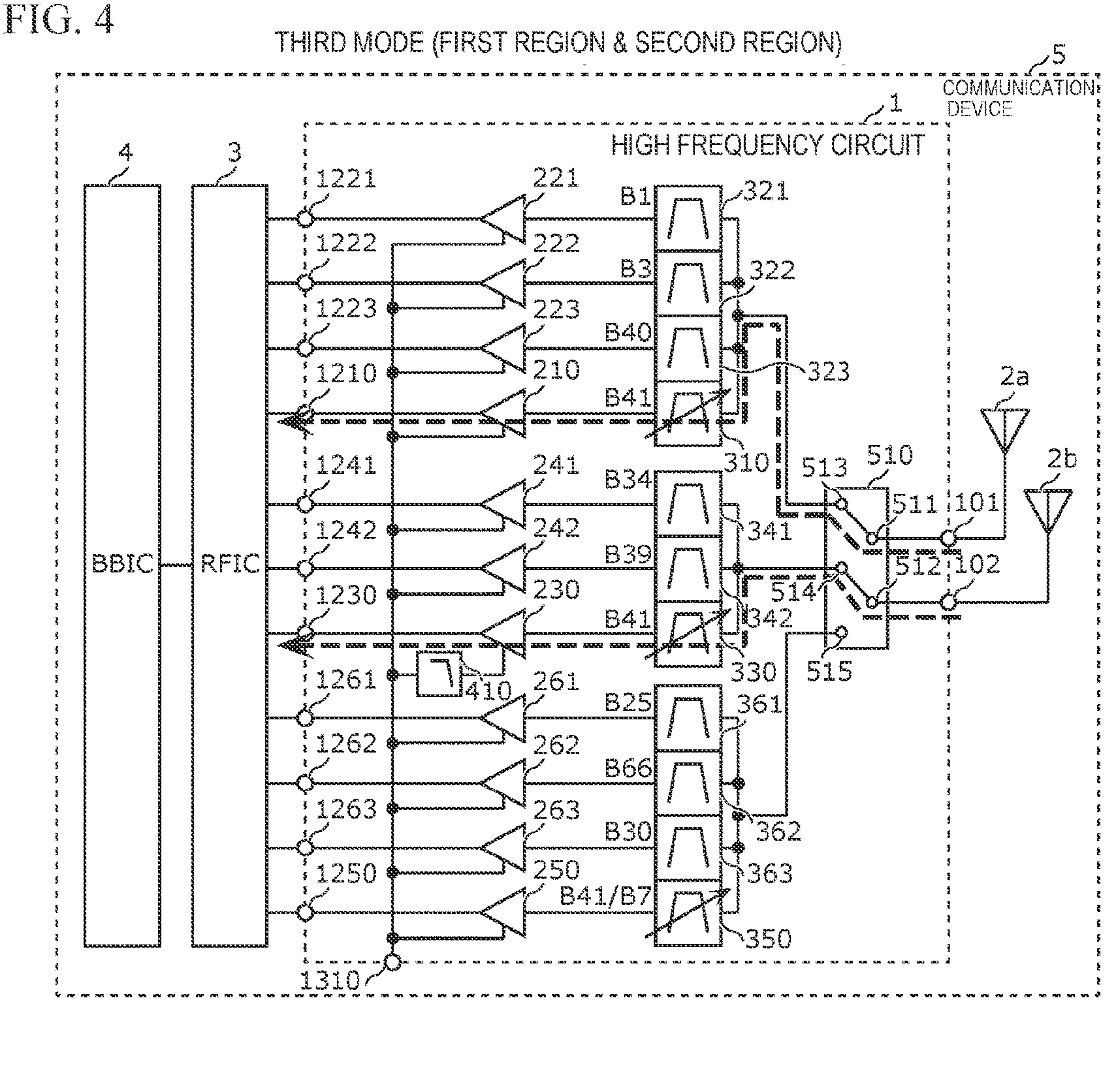
FIG. 4 is a diagram illustrating a connection state and flow of a high frequency signal of the high frequency circuit in a third mode according to Embodiment 1.

In the following, a third mode is described with reference to FIG. 4. FIG. 4 is a diagram illustrating a connection state and flow of a high frequency signal of the high frequency circuit 1 in the third mode according to the present embodiment. In FIG. 4, the dashed arrows represent the flow of the received signals.

The third mode is a communication mode for simultaneously receiving two signals of the first band (B41) in the first region and the second region, and is the communication mode for MIMO, for example. As illustrated in FIG. 4, the switch 510 connects the terminal 511 to the terminal 513, and connects the terminal 512 to the terminal 514. This connects the filters 310 and 321 to 323 to the antenna connection terminal 101, and the filters 330, 341, and 342 to the antenna connection terminal 102. At this time, the filters 310 and 330 are connected to the passband including the first band.

As a result, one of the two first band received signals is transmitted from the antenna 2*a* to the RFIC 3 via the antenna connection terminal 101, the switch 510, the filter 310, the low noise amplifier 210, and the high frequency output terminal 1210. The other of the two first band received signals is transmitted from the antenna 2*b* to the RFIC 3 via the antenna connection terminal 102, the switch 510, the filter 330, the low noise amplifier 230, and the high frequency output terminal 1230.

At this time, the low pass filter 410 suppresses leakage of the first band received signal between the low noise amplifiers 210 and 230, via the supply path of the supply voltage. That is, interference between the received signal amplified by the low noise amplifier 210 and the received signal amplified by the low noise amplifier 230 is suppressed.

Note that in FIG. 4, instead of the terminal 511, the terminal 512 is connected to the terminal 513, and instead of the terminal 512, the terminal 511 may be connected to the terminal 514. Even in this case, the two first band received signals are transmitted from the antennae 2*a* and 2*b* to the RFIC 3 via the filters 330 and 310, respectively.

Note that in the first region, it is also possible to simultaneously receive the two first band signals using the filter 350, instead of the filter 330. In the present embodiment, however, since a number of the filters connected to the terminal 514 is smaller than that of filters connected to the terminal 515, the filter 330 is used preferentially over the filter 350, to simultaneously receive the two first band received signals in the first region.

In addition, in the second region, it is also possible to simultaneously receive the two first band signals using the filter 350, instead of the filter 310. This is described below with reference to FIG. 6.

1.4.4 Fourth Mode

Figure 5:
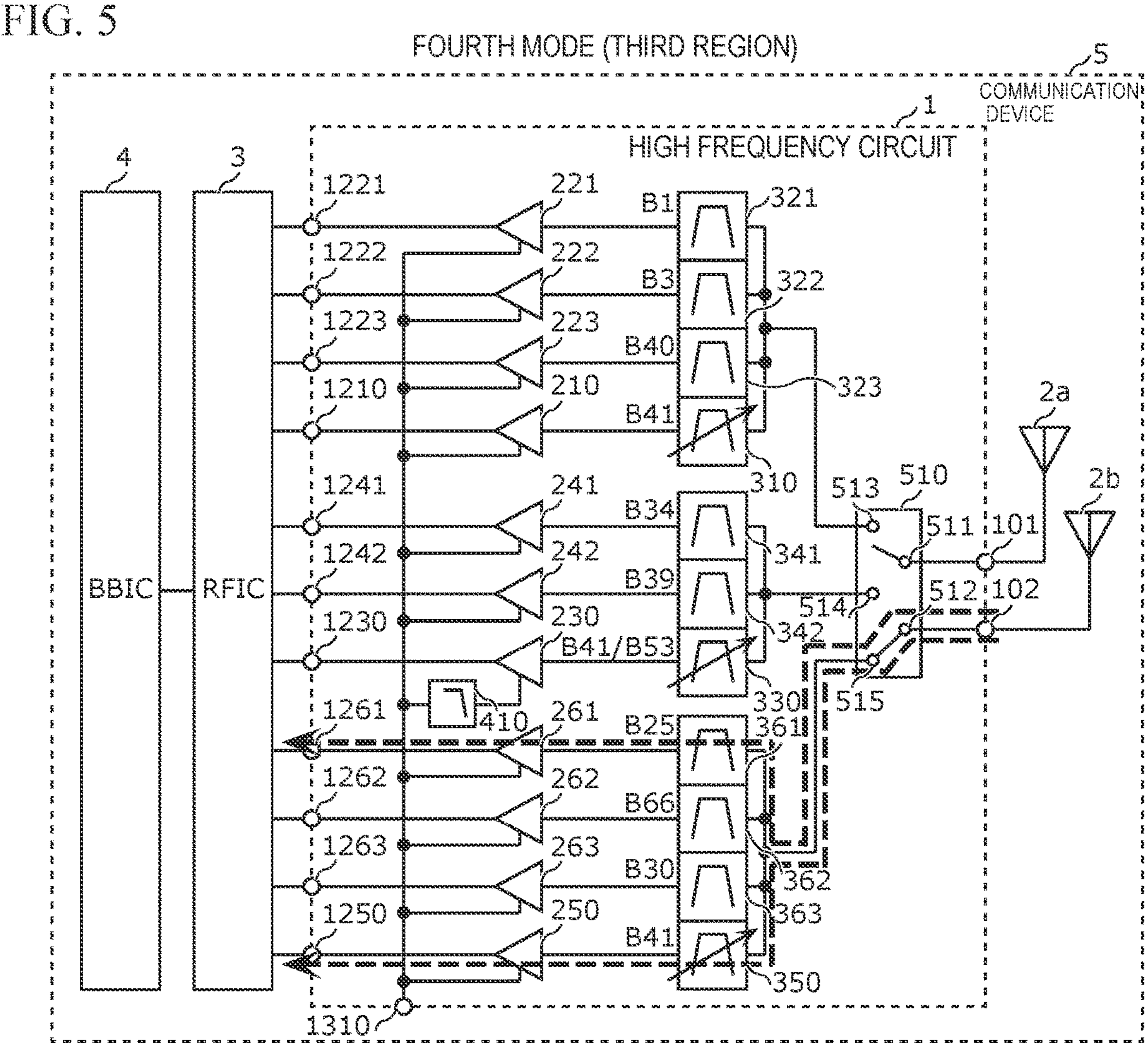
FIG. 5 is a diagram illustrating a connection state and flow of a high frequency signal of the high frequency circuit in a fourth mode according to Embodiment 1.

In the following, a fourth mode is described with reference to FIG. 5. FIG. 5 is a diagram illustrating a connection state and flow of a high frequency signal of the high frequency circuit 1 in the fourth mode according to the present embodiment. In FIG. 5, the dashed arrows represent the flow of the received signals.

The fourth mode is a communication mode for simultaneously receiving signals of the first band (B41) and the fourth band (B25) in the third region. As illustrated in FIG. 5, the switch 510 connects the terminal 512 to the terminal 515. This connects the filters 350, and 361 to 363 to the antenna connection terminal 102. At this time, the filter 350 is adjusted to the passband including the first band.

As a result, the first band received signal is transmitted from the antenna 2*b* to the RFIC 3 via the antenna connection terminal 102, the switch 510, the filter 350, the low noise amplifier 250, and the high frequency output terminal 1250. The fourth band received signal is transmitted from the antenna 2*b* to the RFIC 3 via the antenna connection terminal 102, the switch 510, the filter 361, the low noise amplifier 261, and the high frequency output terminal 1261.

Note that in FIG. 5, instead of signals of Band25 for LTE and n25 for 5G NR, signals of Band30 or Band66 for LTE or n30 or n66 for 5G NR may be received. In addition, instead of the terminal 512, the terminal 511 may be connected to the terminal 515. In this case, the first band received signal and the fourth band received signal are transmitted from the antenna 2*a* to the RFIC 3 via the antenna connection terminal 101, in a similar manner as described above.

1.4.5 Fifth Mode

Figure 6:
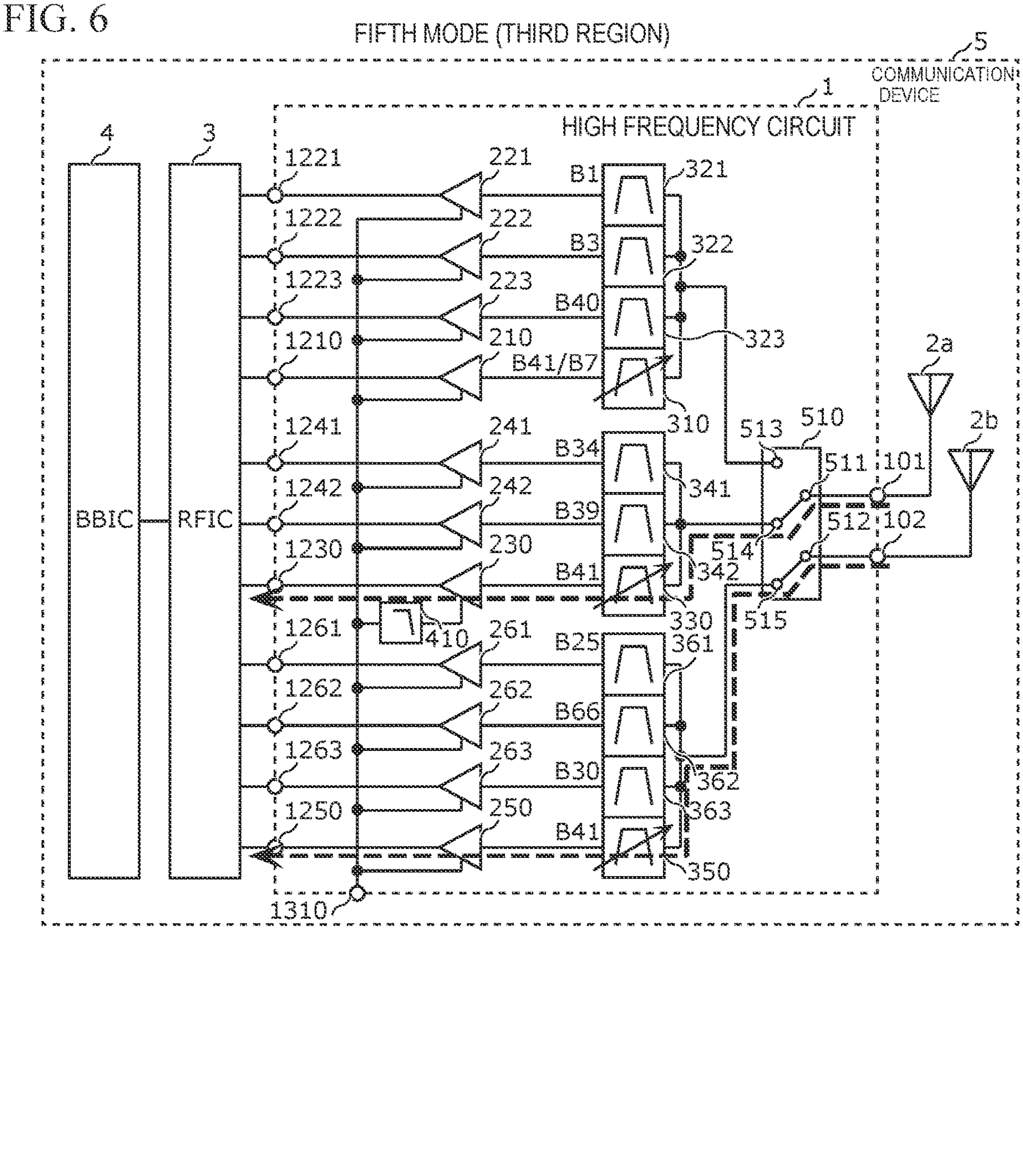
FIG. 6 is a diagram illustrating a connection state and flow of a high frequency signal of the high frequency circuit in a fifth mode according to Embodiment 1.

In the following, a fifth mode is described with reference to FIG. 6. FIG. 6 is a diagram illustrating a connection state and flow of a high frequency signal of the high frequency circuit 1 in the fifth mode according to the present embodiment. In FIG. 6, the dashed arrows represent the flow of the received signals.

The fifth mode is a communication mode for simultaneously receiving two signals of the first band (B41) in the third region, and is the communication mode for MIMO, for example. As illustrated in FIG. 6, the switch 510 connects the terminal 511 to the terminal 514, and connects the terminal 512 to the terminal 515. This connects the filters 330, 341, and 342 to the antenna connection terminal 101, and the filters 350, and 361 to 363 to the antenna connection terminal 102. At this time, the filters 330 and 350 are connected to the passband including the first band.

As a result, one of the two first band received signals is transmitted from the antenna 2*a* to the RFIC 3 via the antenna connection terminal 101, the switch 510, the filter 330, the low noise amplifier 230, and the high frequency output terminal 1230. The other of the two first band received signals is transmitted from the antenna 2*b* to the RFIC 3 via the antenna connection terminal 102, the switch 510, the filter 350, the low noise amplifier 250, and the high frequency output terminal 1250.

At this time, the low pass filter 410 suppresses leakage of the first band received signal between the low noise amplifiers 230 and 250, via the supply path of the supply voltage. That is, interference between the received signal amplified by the low noise amplifier 230 and the received signal amplified by the low noise amplifier 250 is suppressed.

Note that in FIG. 6, instead of the terminal 511, the terminal 512 is connected to the terminal 514, and instead of the terminal 512, the terminal 511 may be connected to the terminal 515. Even in this case, the two first band received signals are transmitted from the antennae 2*a* and 2*b* to the RFIC 3 via the filters 350 and 330, respectively.

Note that in the third region, it is also possible to simultaneously receive the two first band signals using the filter 310, instead of the filter 330. In the present embodiment, however, since the number of the filters connected to the terminal 514 is smaller than that of filters connected to the terminal 513, the filter 330 is used preferentially over the filter 310, to simultaneously receive the two first band received signals in the third region.

In addition, the fifth mode may be used in the second region. Since the number of the filters connected to the terminal 513 is equal to that of filters connected to the terminal 515, any of the second mode and the fifth mode may be used in the second region.

1.4.6 Sixth Mode

Figure 7:
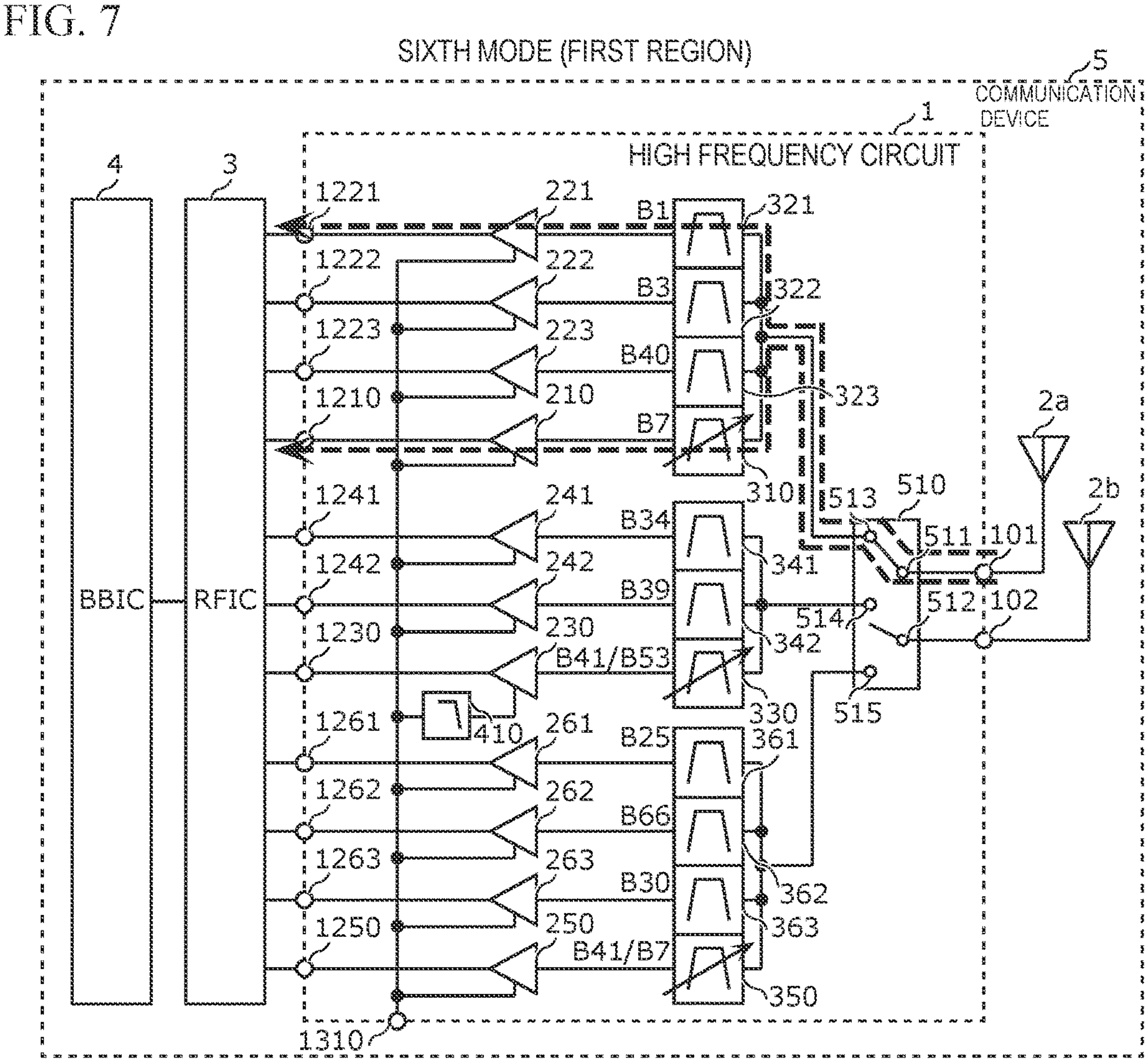
FIG. 7 is a diagram illustrating a connection state and flow of a high frequency signal of the high frequency circuit in a sixth mode according to Embodiment 1.

First, a sixth mode is described with reference to FIG. 7. FIG. 7 is a diagram illustrating a connection state and flow of a high frequency signal of the high frequency circuit 1 in the sixth mode according to the present embodiment. In FIG. 7, the dashed arrows represent the flow of the received signals.

The sixth mode is a communication mode for simultaneously receiving signals of the second band (B1) and the fifth band (B7) in the first region. As illustrated in FIG. 7, the switch 510 connects the terminal 511 to the terminal 513. This connects the filters 310, and 321 to 323 to the antenna connection terminal 101. At this time, the filter 310 is adjusted to the passband including the fifth band.

As a result, the second band received signal is transmitted from the antenna 2*a* to the RFIC 3 via the antenna connection terminal 101, the switch 510, the filter 321, the low noise amplifier 221, and the high frequency output terminal 1221. The fifth band received signal is transmitted from the antenna 2*a* to the RFIC 3 via the antenna connection terminal 101, the switch 510, the filter 310, the low noise amplifier 210, and the high frequency output terminal 1210.

Note that in FIG. 7, instead of signals of Band1 for LTE and n1 for 5G NR, signals of Band3 or Band40 for LTE or n3 or n40 for 5G NR may be received. In addition, instead of the terminal 511, the terminal 512 may be connected to the terminal 513. In this case, the second band received signal and the fifth band received signal are transmitted from the antenna 2*b* to the RFIC 3 via the antenna connection terminal 102, in a similar manner as described above.

1.4.7 Seventh Mode

Figure 8:
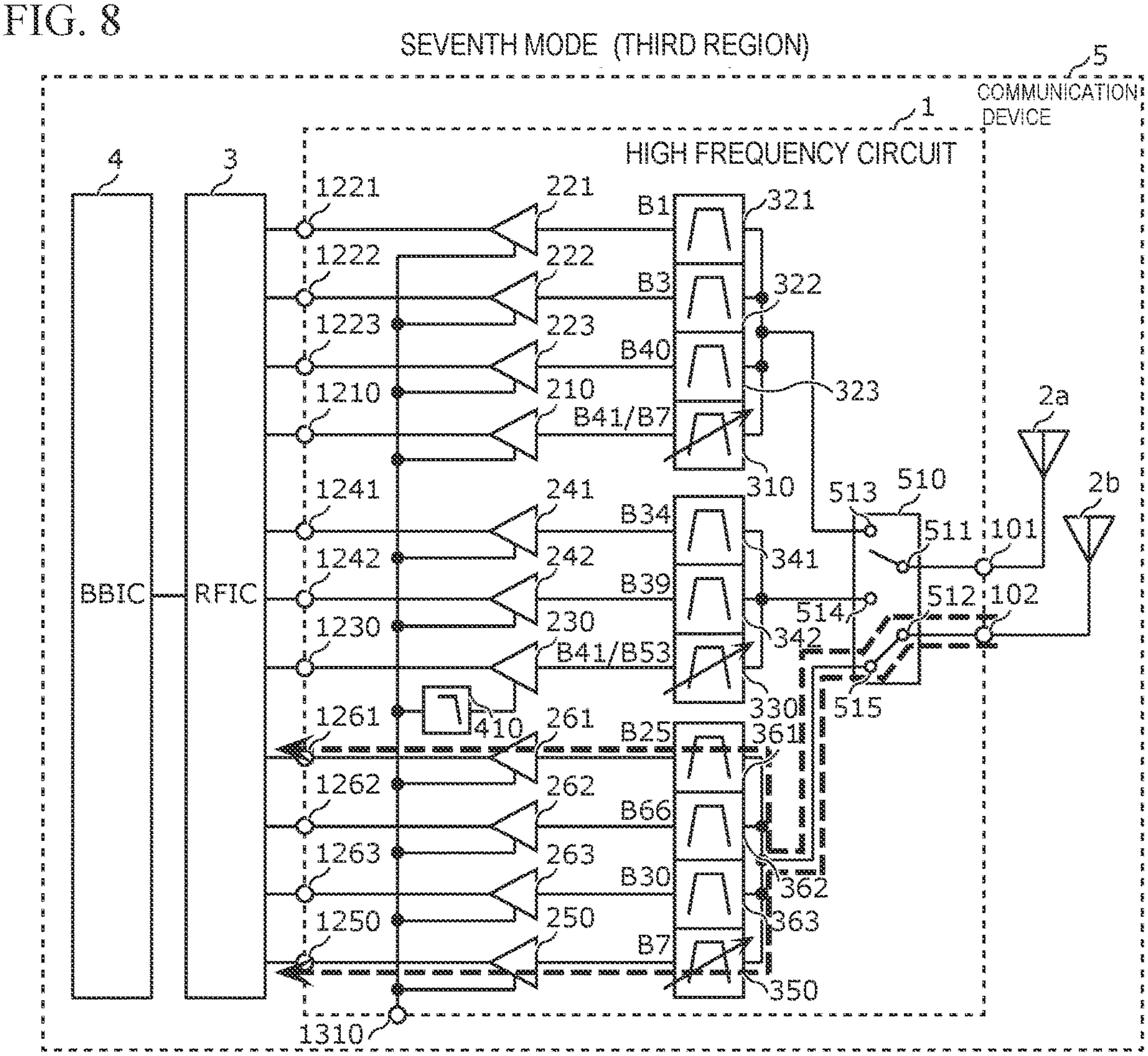
FIG. 8 is a diagram illustrating a connection state and flow of a high frequency signal of the high frequency circuit in a seventh mode according to Embodiment 1.

In the following, a seventh mode is described with reference to FIG. 8. FIG. 8 is a diagram illustrating a connection state and flow of a high frequency signal of the high frequency circuit 1 in the seventh mode according to the present embodiment. In FIG. 8, the dashed arrows represent the flow of the received signals.

The seventh mode is a communication mode for simultaneously receiving signals of the fourth band (B25) and the fifth band (B7) in the third region. As illustrated in FIG. 8, the switch 510 connects the terminal 512 to the terminal 515. This connects the filters 350, and 361 to 363 to the antenna connection terminal 102. At this time, the filter 350 is adjusted to the passband including the fifth band.

As a result, the fourth band received signal is transmitted from the antenna 2*b* to the RFIC 3 via the antenna connection terminal 102, the switch 510, the filter 361, the low noise amplifier 261, and the high frequency output terminal 1261. The fifth band received signal is transmitted from the antenna 2*b* to the RFIC 3 via the antenna connection terminal 102, the switch 510, the filter 350, the low noise amplifier 250, and the high frequency output terminal 1250.

Note that in FIG. 8, instead of signals of Band25 for LTE and n25 for 5G NR, signals of Band30 or Band66 for LTE or n30 or n66 for 5G NR may be received. In addition, instead of the terminal 512, the terminal 511 may be connected to the terminal 515. In this case, the fourth band received signal and the fifth band received signal are transmitted from the antenna 2*a* to the RFIC 3 via the antenna connection terminal 101, in a similar manner as described above.

1.4.8 Summary of Communication Modes

Table 2 below summarizes a relationship between the above first to seventh modes and the filters and bands used in these modes. In Table 2, a cell in which a band is written means that a signal of the band is received using the filter in in the corresponding column in the mode in the corresponding row.

TABLE 2

| | First filter (310) | Second filter (321-323) | Third filter (330) | Fourth filter (341-342) | Fifth filter (350) | Sixth filter (361-363) |
|---|---|---|---|---|---|---|
| First mode (First region) | First band | Second band | — | — | — | — |
| Second mode (Second region) | — | — | First band | Third band | — | — |
| Third mode (First and Second regions) | First band | — | First band | — | — | — |
| Fourth mode (Third region) | — | — | — | — | First band | Fourth band |
| Fifth mode (Third region) | — | — | First band | — | First band | — |
| Sixth mode (First region) | Fifth band | Second band | — | — | — | — |
| Seventh mode (Third region) | — | — | — | — | Fifth band | Fourth band |

Note that the first mode to the seventh mode exemplarily illustrate the communication modes for simultaneously receiving two signals, and the communication modes that can be used in the high frequency circuit 1 are not limited to the first mode to the seventh mode. For example, the high frequency circuit 1 may have a communication mode for simultaneously receiving three or more signals. Specifically, the high frequency circuit 1 may have, for example, a communication mode for simultaneously receiving the first band (B41) signal, the second band (B1) signal, and the second band (B3) signal. Such a communication mode may be realized in the same communication state as that of the first mode. In addition, the high frequency circuit 1 may have, for every band, a communication mode for receiving one signal of one band using one filter.

1.5 Effects, etc.

As described above, the high frequency circuit 1 according to the present embodiment includes the filter 310 that has the passband including the reception band of the first band that can be used in the first region and the second region; the filter 321 that has the passband including the reception band of the second band that can be used in the first region; the filter 330 that has the passband including the first band reception band; the filter 341 that has the passband including the reception band of the third band that can be used in the second region; and the switch 510 including the terminal 511 connected to the antenna connection terminal 101, the terminal 512 connected to the antenna connection terminal 102, the terminal 513 connected to the plurality of filters including the filters 310 and 321, and the terminal 514 connected to the plurality of filters including the filters 330 and 341, the high frequency circuit 1 having a first mode in which in the first region, the terminal 511 or 512 is connected to the terminal 513 to simultaneously receive the first band and second band signals; a second mode in which in the second region, the terminal 511 or 512 is connected to the terminal 514 to simultaneously receive the first band and third band signals; and a third mode in which in the first region and the second region, the terminals 511 and 512 are connected to the terminals 513 and 514, respectively, to simultaneously receive the two first band signals.

According to this, the two filters 310 and 330 for the first band that can be used in the first region and the second region are connected to the two terminals 513 and 514 of the switch 510, respectively. At this time, to the two terminals 513 and 514 are connected the filter 321 for the second band that can be used in the first region and the filter 341 for the third band that can be used in the second region. Therefore, it is possible to reduce the number of the terminals of the switch 510 as compared to a case in which the filters 310 and 330 are connected alone to the terminals of the switch 510. As a result, parasitic capacitance of the switch 510 can be reduced, and the NF in the first mode to the third mode can be improved. In the first mode and the second mode, in particular, signals of the two bands can be simultaneously received by the plurality of filters connected to one terminal of the switch 510, which is effective for improvement of the NF. In addition, it is possible to support the third mode in which two signals of the same band are simultaneously received via the two antenna connection terminals 101 and 102, without necessarily adding a new filter.

In addition, for example, in the high frequency circuit 1 of the present embodiment, the third mode may be the communication mode for MIMO.

According to this, the high frequency circuit 1 can support simultaneous reception of two signals for MIMO, and when combined with other high frequency circuits, can support simultaneous reception of four signals or six signals for MIMO.

In addition, for example, in the high frequency circuit 1 according to the present embodiment, the first band may be Band41 for LTE or n41 for 5G NR, the second band may be Band1, Band3, or Band 40 for LTE or n1, n3, or n40 for 5G NR, and the third band may be Band34 or Band 39 for LTE or n34 or n39 for 5G NR.

According to this, it is possible to support reception of signals of bands for LTE and/or 5G NR.

In addition, for example, in the high frequency circuit 1 according to the present embodiment, the first band may further be usable in the third region. The high frequency circuit 1 may further include the filter 350 that has the passband including the first band reception band and the filter 361 that has the passband including the reception band of the fourth band that can be used in the third region. The switch 510 may further include the terminal 515 connected to the plurality of filters including the filters 350 and 361. The high frequency circuit 1 may have the fourth mode in which in the third region, the terminal 511 or 512 is connected to the terminal 515 to simultaneously receive the first band and fourth band signals, and the fifth mode in which in the third region, the terminals 511 and 512 are connected to the terminals 514 and 515, respectively, to simultaneously receive the two first band signals.

According to this, the three filters 310, 330, and 350 for the first band that can be used in the first region to the third region are connected to the three terminals 513 to 515 of the switch 510, respectively. At this time, of the three terminals 513 to 515, the filter 310 is connected to the same terminal 513 as the filter 321 for the second band that can be used in the first region. The filter 330 is connected to the same terminal 514 as the filter 341 for the third band that can be used in the second region. The filter 350 is connected to the terminal 515 as the filter 361 for the fourth band that can be used in the third region. Therefore, it is possible to reduce the number of the terminals of the switch 510, as compared to a case in which each of the filters 310, 330, and 350 is connected alone to the switch 510. As a result, the parasitic capacitance of the switch 510 can be reduced, and the NF in the first mode to the fifth mode can be improved. In the first mode, the second mode, and the fourth mode, in particular, signals of two bands can be simultaneously received by the plurality of filters connected to one terminal of the switch 510, which is effective for the improvement of the NF. In addition, it is possible to support the third mode and the fifth mode in which two signals of the same band are simultaneously received via the two antenna connection terminals 101 and 102, without necessarily adding a new filter.

In addition, for example, in the high frequency circuit 1 according to the present embodiment, the fifth mode may be the communication mode for MIMO.

According to this, the high frequency circuit 1 can support simultaneous reception of two signals for MIMO, and when combined with other high frequency circuits, can support simultaneous reception of four signals or six signals for MIMO.

In addition, for example, in the high frequency circuit 1 according to the present embodiment, in the fifth mode, if the number of the plurality of filters connected to the terminal 514 is smaller than that of the plurality of filters connected to the terminal 513, the terminals 511 and 512 may be connected to the terminals 514 and 515, respectively, to simultaneously receive the two signals of the first band. If the number of the plurality of filters connected to the terminal 514 is not smaller than that of the plurality of filters connected to the terminal 513, the terminals 511 and 512 may be connected to the terminals 513 and 514, respectively, to simultaneously receive the two signals of the first band.

According to this, in MIMO in the third region, of the terminal 513 to which the plurality of filters for the first region is connected and the terminal 514 to which the plurality of filters for the second region is connected, it is possible to connect, to the terminal 511, the terminal with the smaller number of the plurality of filters connected. That is, it is possible to use the terminal with the smaller number of the filters connected simultaneously can be used for MIMO reception, which can improve the NF when MIMO is in use.

In addition, for example, in the high frequency circuit 1 according to the present embodiment, the fourth band may be Band25, Band30, or Band66 for LTE or n25, n30, or n66 for 5G NR.

According to this, it is possible to support reception of signals of Band25, Band30, or Band66 for LTE or n25, n30, or n66 for 5G NR.

In addition, for example, in the high frequency circuit 1 according to the present embodiment, each of the filters 310 and 350 may be a filter adjustable to the passband including the first band and to the passband including the fifth band that can be used in the first band and the third band. The high frequency circuit 1 may further have the sixth mode in which in the first region, the terminal 511 or 512 is connected to the terminal 513 to simultaneously receive the second band and fifth band signals, and the seventh mode in which in the third region, the terminal 511 or 512 is connected to the terminal 515 to simultaneously receive the fourth band and fifth band signals. In the first mode and the third mode, the passband of the filter 310 may be adjusted to the passband including the first band. In the sixth mode, the passband of the filter 310 may be adjusted to the passband including the fifth mode. In the fourth mode and the fifth mode, the passband of the filter 350 may be adjusted to the passband including the first band. In the seventh mode, the passband of the filter 350 may be adjusted to the passband including the fifth band.

According to this, it is possible to realize a filter for the first band and the fifth band that can be simultaneously received with the second band, by the one filter 310 capable of adjusting the passband, and to realize a filter for the first band and the fifth band that can be simultaneously received with the fourth band, by the one filter 350 capable of adjusting the passband. Therefore, the number of the filters can be reduced and the number of the terminals of the switch 510 can be reduced. As a result, the parasitic capacitance of the switch 510 can be reduced, and the NF in the first mode to the seventh mode can be improved.

In addition, for example, in the high frequency circuit 1 according to the present embodiment, the fifth band may be Band7 for LTE or n7 for 5G NR.

According to this, it is possible to support reception of signals of Band7 for LTE or n7 for 5G NR.

In addition, for example, in the high frequency circuit 1 according to the present embodiment, the filters 330 may be a filter adjustable to the passband including the first band and to the passband including the sixth band that can be used in the second band. In the second mode, the third mode, and the fifth mode, the passband of the filter 330 may be adjusted to the passband including the first band.

According to this, it is possible to realize a filter for the first band and the sixth band by the one filer 330 capable adjusting the passband. Therefore, the number of the filters can be reduced and the number of the terminals of the switch 510 can be reduced. As a result, the parasitic capacitance of the switch 510 can be reduced, and the NF in the first mode to the seventh mode can be improved.

In addition, for example, in the high frequency circuit 1 according to the present embodiment, the sixth band may be Band53 for LTE or n53 for 5G NR.

According to this, it is possible to support reception of signals of Band53 for LTE or n53 for 5G NR.

In addition, for example, the high frequency circuit 1 according to the present embodiment may further include the low noise amplifier 210 connected to the filter 310, the low noise amplifier 230 connected to the filter 330, the power supply voltage terminal 1310 connected to the low noise amplifiers 210 and 230 and receiving the supply voltage from outside of the high frequency circuit 1, and the low pass filter 410 connected between at least one of the low noise amplifier 210 or 230 and the power supply voltage terminal 1310.

According to this, since the low pass filter 410 is connected to the supply path of the supply voltage between the low noise amplifiers 210 and 230, it is possible to enhance isolation between the low noise amplifiers 210 and 230 in the first band. Therefore, leakage of the first band received signal between the low noise amplifiers 210 and 230 via the supply path of the supply voltage is suppressed. As a result, the interference between the received signal amplified by the low noise amplifier 210 and the received signal amplified by the low noise amplifier 230 is suppressed, and the NF can be improved.

In addition, for example, in the high frequency circuit 1 according to the present embodiment, the filters 310 and 330 may be acoustic wave filters and may be mounted on the same piezoelectric body.

According to this, it is possible to make the filters 310 and 330 smaller than a case in which the two filters 310 and 330 are mounted on separate piezoelectric bodies, which can contribute to downsizing of the communication device 5.

The communication device 5 according to the present embodiment includes the RFIC 3 configured to process high frequency signals, and the above-described high frequency circuit 1 configured to transmit high frequency signals between the RFIC 3 and the antennae 2*a* and 2*b*.

According to this, the communication device 5 can achieve similar effects to the high frequency circuit 1 described above.

Embodiment 2

In the following, Embodiment 2 is described. The present embodiment differs from Embodiment 1 described above mainly in that two filters adjustable to the passband including the first band and to the passband including the fifth band are replaced with a filter that has the passband including the first band and a filter that has the passband including the fifth band, and that the two replaced filters can be selected via a switch. Hereinafter, a description is given of the present embodiment, focusing on the differences from Embodiment 1, with reference to the drawings.

2.1 Circuit Configuration of High Frequency Circuit 1A

A communication device 5A according to the present embodiment is similar to the communication device 5 according to Embodiment 1, except for the point that the communication device 5A includes a high frequency circuit 1A instead of the high frequency circuit 1. Therefore, a circuit configuration of the high frequency circuit 1A is described with reference to FIG. 9.

Figure 9:
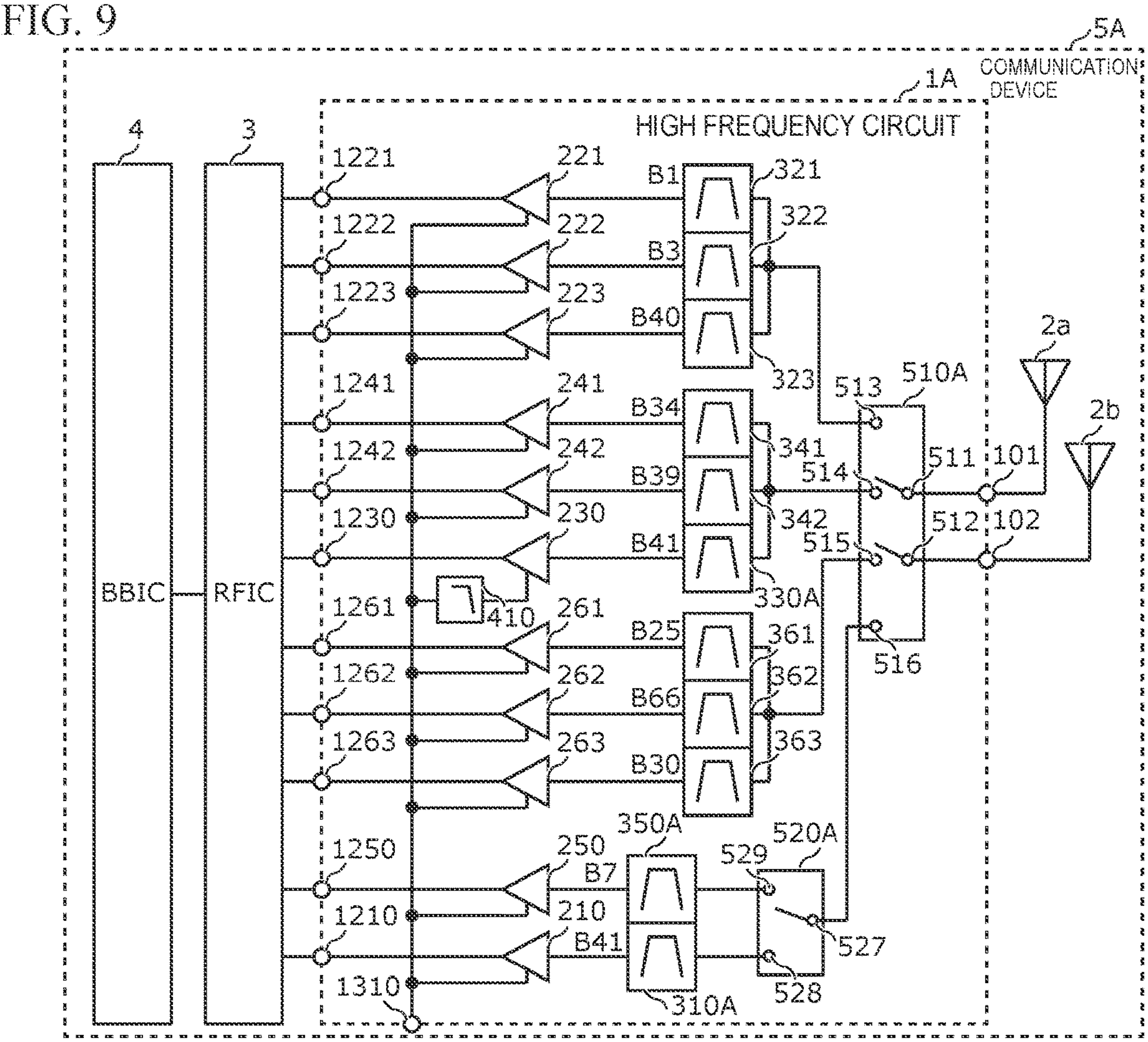
FIG. 9 is a circuit configuration diagram of a communication device according to Embodiment 2.

FIG. 9 is a circuit configuration diagram of the communication device 5A according to the present embodiment. In FIG. 9, numbers with B written to filters are similar to those in FIG. 1.

Note that FIG. 9 illustrates an exemplary circuit configuration of the communication device 5A and the high frequency circuit 1A. The communication device 5A and the high frequency circuit 1A may be implemented by using any of a variety of the circuit implementations and the circuit techniques. Therefore, a description of the communication device 5A and the high frequency circuit 1A provided below should not be interpreted in a limiting manner.

The high frequency circuit 1A can transmit high frequency signals between the antennae 2*a* and 2*b* and the RFIC 3. The high frequency circuit 1A includes the antenna connection terminals 101 and 102, the low noise amplifiers 210, 221 to 223, 230, 241, 242, 250, and 261 to 263, filters 310A, 321 to 323, 330A, 341, 342, 350A, and 361 to 363, a low pass filter 410, switches 510A and 520A, the high frequency output terminals 1210, 1221 to 1223, 1230, 1241, 1242, 1250, and 1261 to 1263, and the power supply voltage terminal 1310.

The filter 310A is an example of the first filter, and is a band pass filter that has the passband including the reception band of the first band that can be used in the first region, the second region, and the third region. The filter 310A is connected between the switch 520A and the low noise amplifier 210. Specifically, one end of the filter 310A is connected to a terminal 528 of the switch 520A, and the other end of the filter 310A is connected to the input end of the low noise amplifier 210.

The filter 330A is an example of the third filter, and is a band pass filter that has the passband including the reception band of the first band that can be used in the first region, the second region, and the third region. The filter 330A is connected between the switch 510A and the low noise amplifier 230. Specifically, one end of the filter 330A is connected to the terminal 514 of the switch 510A, and the other end of the filter 330A is connected to the input end of the low noise amplifier 230.

The filter 350A is an example of the fifth filter, and is a band pass filter that has the passband including the reception band of the fifth band that can be used in the first region and the third region. The filter 350A is connected between the switch 520A and the low noise amplifier 250. Specifically, one end of the filter 350A is connected to a terminal 529 of the switch 520A, and the other end of the filter 350A is connected to the input end of the low noise amplifier 250.

As such filters 310A, 330A, and 350A, the SAW filter, the BAW filter, the LC resonant filter, or the dielectric resonant filter, or any combination thereof may be used, and, furthermore, the filters are not limited thereto. Note that when the filters 310 and 330 are the acoustic wave filters, the filters 310A and 330A can be mounted in or on the same piezoelectric body. For example, the single crystal of $LiTaO_3$, $LiNbO_3$, AlN, or Zno or ceramics can be used as the piezoelectric body.

The switch 510A is connected between the antenna connection terminals 101 and 102, the filters 310A, 321 to 323, 330A, 341, 342, 350A, and 361 to 363. Specifically, the switch 510A includes the terminals 511 to 516. The terminal 511 is an example of the first terminal and is connected to the antenna connection terminal 101. The terminal 512 is an example of the second terminal and connected to the antenna connection terminal 102. The terminal 513 is an example of the third terminal and connected to the filters 321 to 323. The terminal 514 is an example of the fourth terminal and connected to the filters 330A, 341, and 342. The terminal 515 is an example of the fifth terminal and connected to the filters 361 to 363. A terminal 516 is an example of a sixth terminal, and selectively connected to the filter 310A and 350A via the switch 520A.

In such a connection configuration, the switch 510A can connect the terminals 511 and 512 to the terminals 513 to 516 based on the control signal from the RFIC 3, for example. That is, the switch 510A can switch between connecting only one of the terminals 511 and 512 to any of the terminals 513 to 516, and connecting the terminals 511 and 512 to any two of the terminals 513 to 516. The switch 510A includes, for example, the multi-connection type switch circuit.

The switch 520A is connected between the switch 510A and he filters 310A and 350A. Specifically, the switch 520A includes terminals 527 to 529. The terminal 527 is an example of a seventh terminal and connected to the terminal 516 of the switch 510A. The terminal 528 is an example of an eighth terminal and connected to the filter 310A. The terminal 529 is an example of a ninth terminal and connected to the filter 350A.

In such a connection configuration, the switch 520A can exclusively connect the terminal 527 to the terminals 528 and 529 based on the control signal from the RFIC 3, for example. That is, the switch 520A can switch between connecting the terminal 527 to the terminal 528 and connecting the terminal 527 to the terminal 529. The switch 520A includes a single-pole double-throw (SPDT) type switching circuit, for example.

2.2 Communication Modes

In the following, a description is given of communication modes of the high frequency circuit 1A according to the present embodiment for simultaneously receiving two high frequency signals.

2.2.1 First Mode

Figure 10:
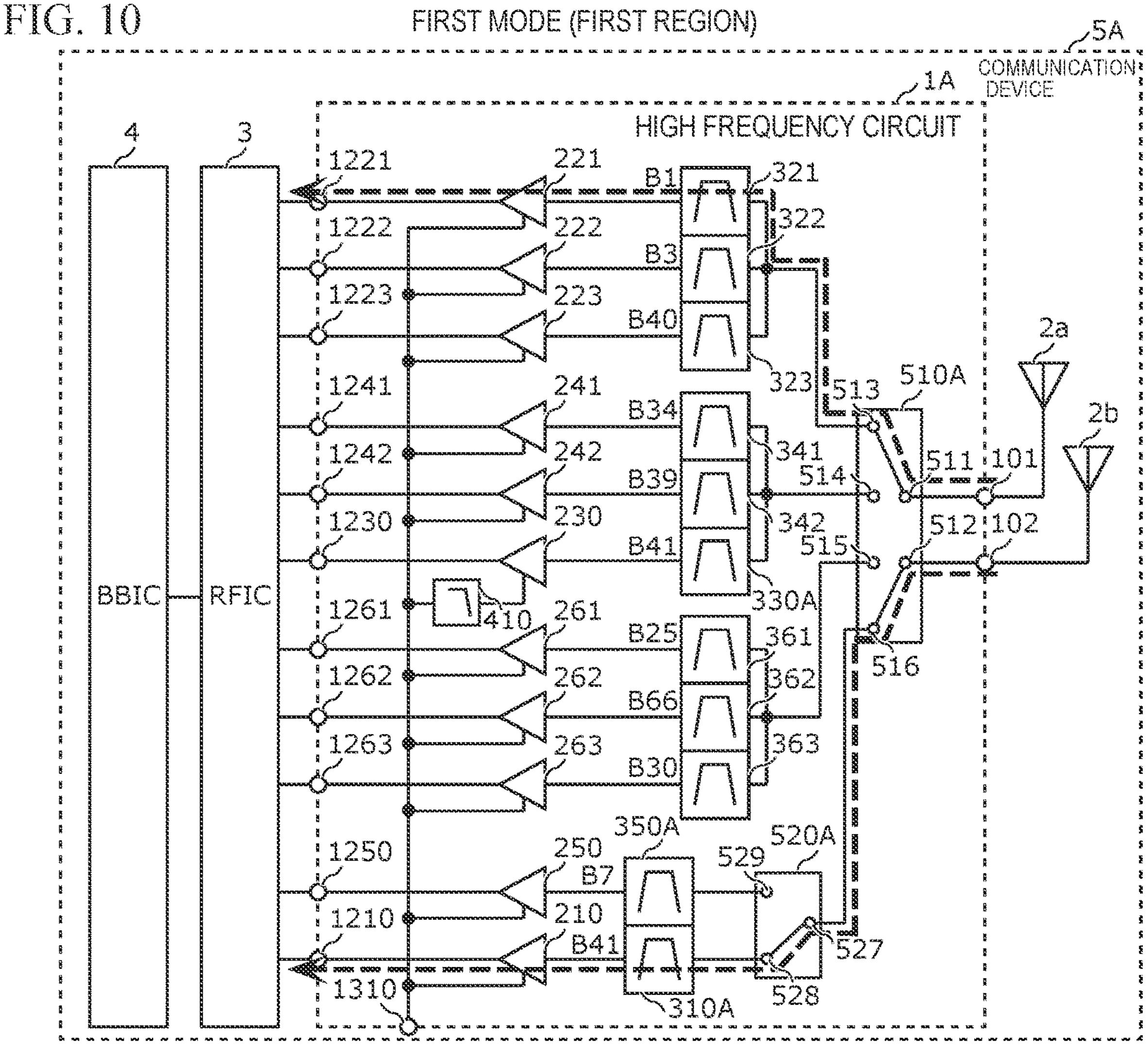
FIG. 10 is a diagram illustrating a connection state and flow of a high frequency signal of a high frequency in a first mode according to Embodiment 2.

First, the first mode is described with reference to FIG. 10. FIG. 10 is a diagram illustrating a connection state and flow of a high frequency signal of the high frequency circuit 1A in the first mode according to the present embodiment. In FIG. 10, the dashed arrows represent the flow of the received signals.

The first mode is a communication mode for simultaneously receiving the first band (B41) and the second band (B1) signals in the first region. As illustrated in FIG. 10, the switch 510A connects the terminal 511 to the terminal 513, and connects the terminal 512 to the terminal 516. Furthermore, the switch 520A connects the terminal 527 to the terminal 528. This connects the filters 321 to 323 to the antenna connection terminal 101, and connects the filter 310A to the antenna connection terminal 102.

As a result, the first band received signal is transmitted from the antenna 2_b_ to the RFIC 3 via the antenna connection terminal 102, the switch 510A, the switch 520A, the filter 310A, the low noise amplifier 210, and the high frequency output terminal 1210. The second band received signal is transmitted from the antenna 2_b_ to the RFIC 3 via the antenna connection terminal 101, the switch 510A, the filter 321, the low noise amplifier 221, and the high frequency output terminal 1221.

Note that in FIG. 10, instead of signals of Band1 for LTE or n1 for 5G NR, signals of Band3 or Band40 for LTE or n3 or n40 for 5G NR may be received. In addition, instead of the terminal 511, the terminal 512 may be connected to the terminal 513, and instead of the terminal 512, the terminal 511 may be connected to the terminal 516.

2.2.2 Second Mode

Figure 11:
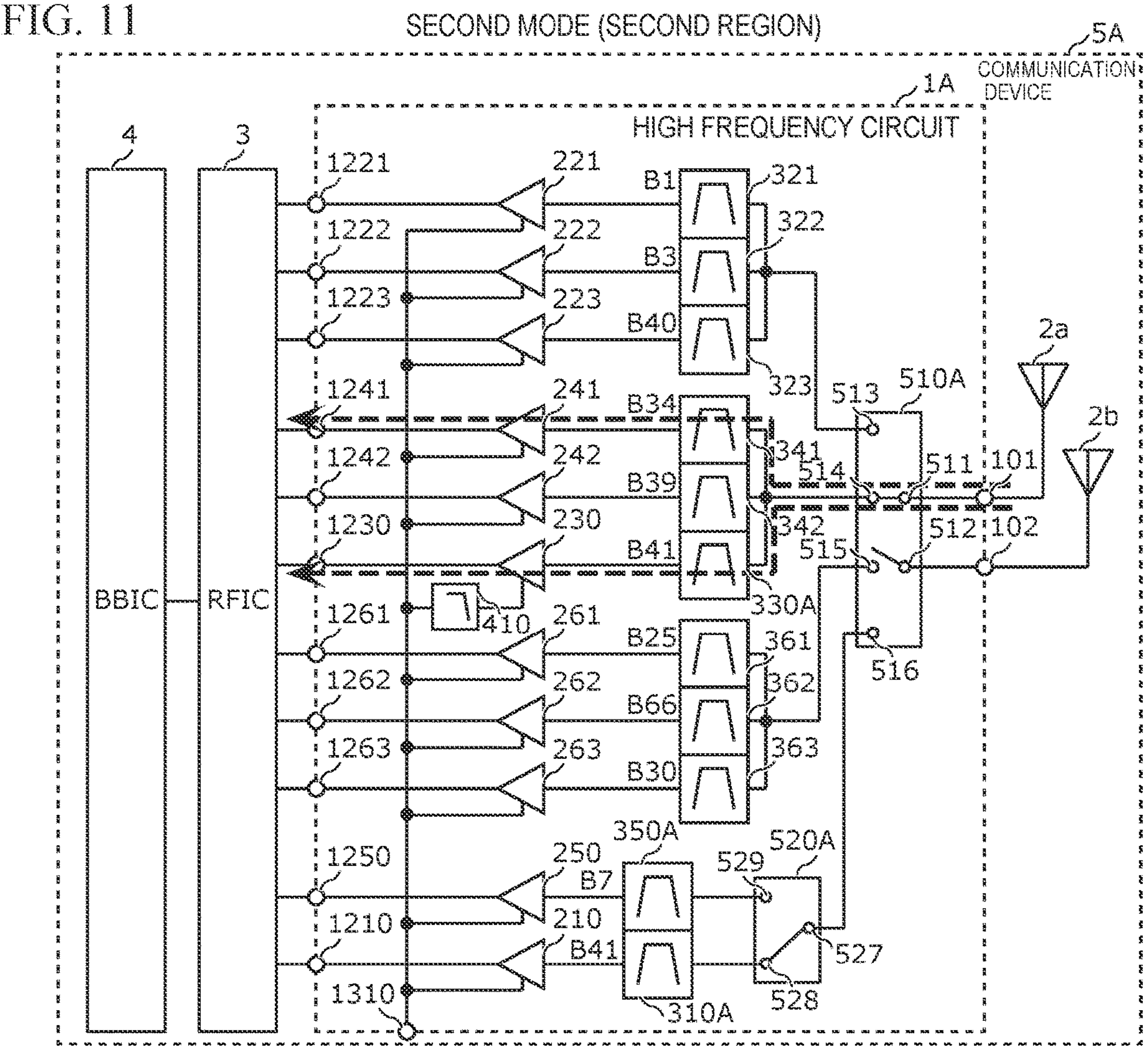
FIG. 11 is a diagram illustrating a connection state and flow of a high frequency signal of the high frequency circuit in a second mode according to Embodiment 2.

In the following, the second mode is described with reference to FIG. 11. FIG. 11 is a diagram illustrating a connection state and flow of a high frequency signal of the high frequency circuit 1A in the second mode according to the present embodiment. In FIG. 11, the dashed arrows represent the flow of the received signals.

The second mode is a communication mode for simultaneously receiving the first band (B41) and third band (B34) signals in the second region. As illustrated in FIG. 11, the switch 510A connects the terminal 511 to the terminal 514. This connects the filters 330A, 341, and 342 to the antenna connection terminal 101.

As a result, the first band received signal is transmitted from the antenna 2_a_ to the RFIC 3 via the antenna connection terminal 101, the switch 510A, the filter 330A, the low noise amplifier 230, and the high frequency output terminal 1230. The third band received signal is transmitted from the antenna 2*a* to the RFIC 3 via the antenna connection terminal 101, the switch 510A, the filter 341, the low noise amplifier 241, and the high frequency output terminal 1241.

Note that in FIG. 11, instead of signals of Band34 for LTE or n34 for 5G NR, signals of Band39 for LTE or n39 for 5G NR may be received. In addition, instead of the terminal 511, the terminal 512 may be connected to the terminal 514.

2.2.3 Third Mode

Figure 12:
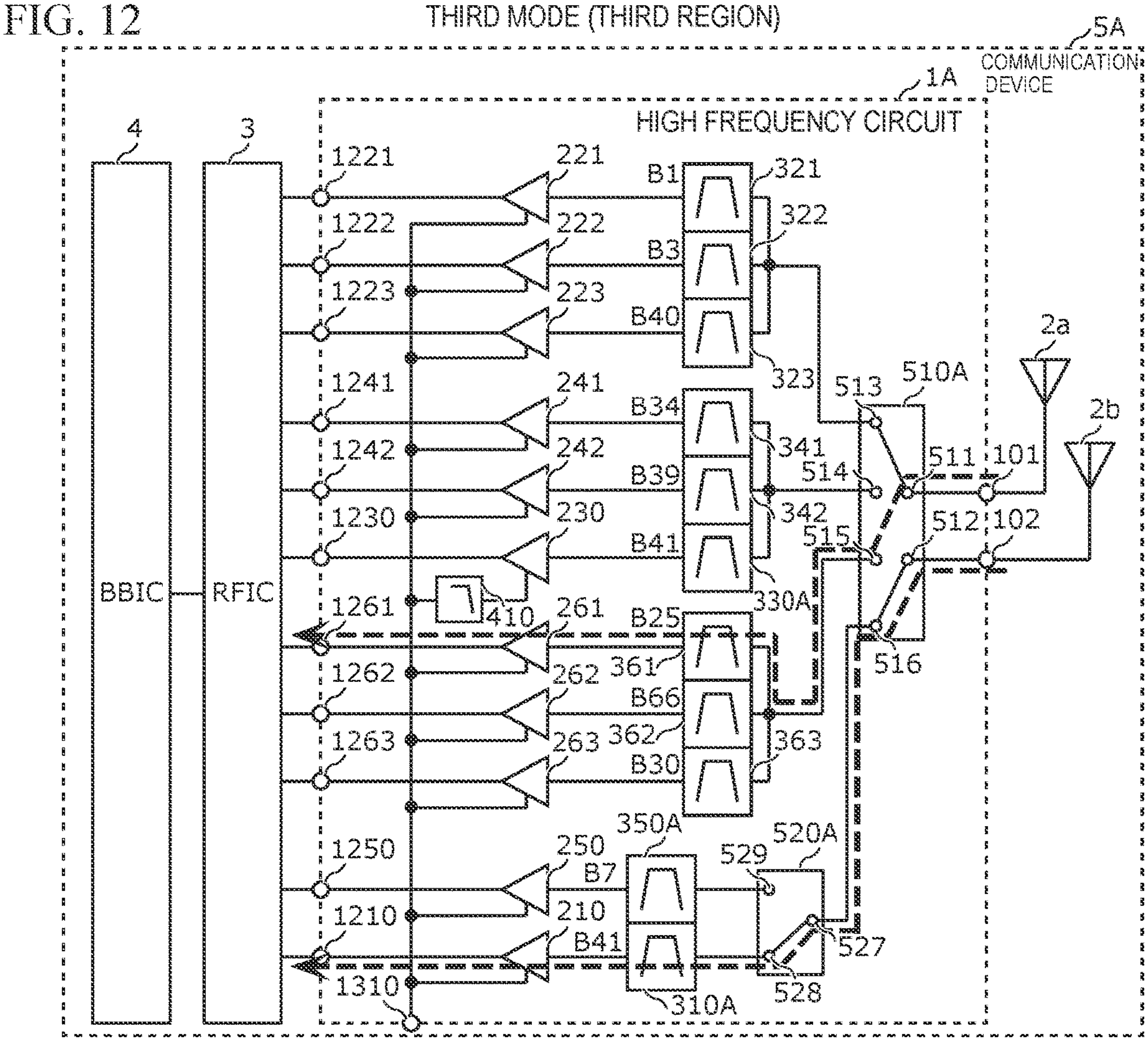
FIG. 12 is a diagram illustrating a connection state and flow of a high frequency signal of the high frequency circuit in a third mode according to Embodiment 2.

In the following, the third mode is described with reference to FIG. 12. FIG. 12 is a diagram illustrating a connection state and flow of a high frequency signal of the high frequency circuit 1A in the third mode according to the present embodiment. In FIG. 12, the dashed arrows represent the flow of the received signals.

The third mode is a communication mode for simultaneously receiving the first band (B41) and fourth band (B25) signals in the third region. As illustrated in FIG. 12, the switch 510A connects the terminal 511 to the terminal 515, and connects the terminal 512 to the terminal 516. Furthermore, the switch 520A connects the terminal 527 to the terminal 528. This connects the filters 361 to 363 to the antenna connection terminal 101, and connects the filter 310A to the antenna connection terminal 102.

As a result, the first band received signal is transmitted from the antenna 2*b* to the RFIC 3 via the antenna connection terminal 102, the switch 510A, the switch 520A, the filter 310A, the low noise amplifier 210, and the high frequency output terminal 1210. The fourth band received signal is transmitted from the antenna 2*a* to the RFIC 3 via the antenna connection terminal 101, the switch 510A, the filter 361, the low noise amplifier 261, and the high frequency output terminal 1261.

Note that in FIG. 12, instead of signals of Band25 for LTE or n25 for 5G NR, signals of Band30 or Band66 for LTE or n30 or n66 for 5G NR may be received. In addition, instead of the terminal 511, the terminal 512 may be connected to the terminal 515, and instead of the terminal 512, the terminal 511 may be connected to the terminal 516.

2.2.4 Third Mode

Figure 13:
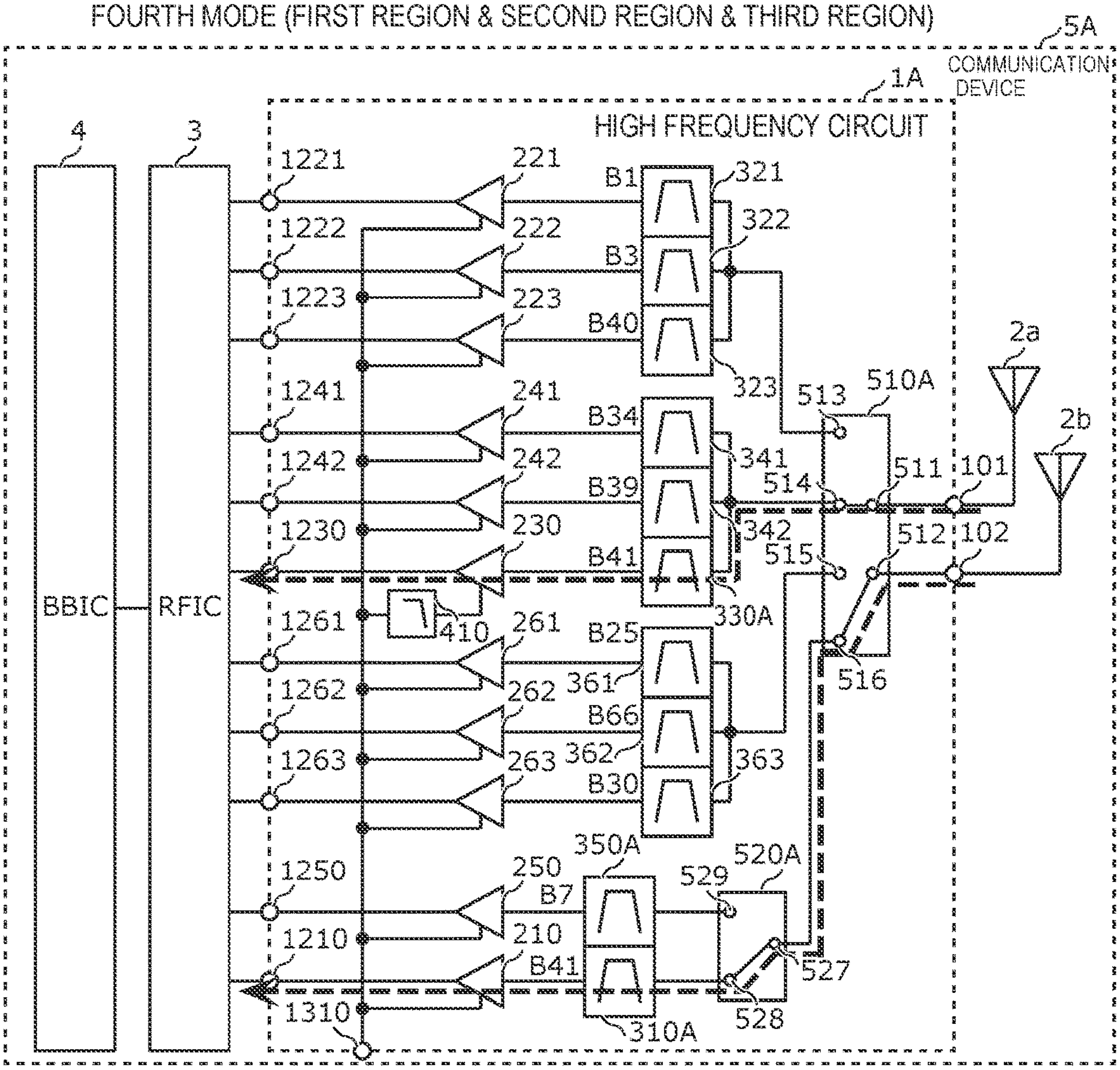
FIG. 13 is a diagram illustrating a connection state and flow of a high frequency signal of the high frequency circuit in a fourth mode according to Embodiment 2.

In the following, the fourth mode is described with reference to FIG. 13. FIG. 13 is a diagram illustrating a connection state and flow of a high frequency signal of the high frequency circuit 1A in the fourth mode according to the present embodiment. In FIG. 13, the dashed arrows represent the flow of the received signals.

The fourth mode is a communication mode for simultaneously receiving two signals of the first band (B41) in the first region, the second region, and the third region, and is the communication mode for MIMO, for example. As illustrated in FIG. 13, the switch 510A connects the terminal 511 to the terminal 514 and connects the terminal 512 to the terminal 516. Furthermore, the switch 520A connects the terminal 527 to the terminal 528. This connects the filters 330A, 341, and 342 to the antenna connection terminal 101, and connects the filter 310A to the antenna connection terminal 102.

As a result, one of the two first band received signals is transmitted from the antenna 2*a* to the RFIC 3 via the antenna connection terminal 101, the switch 510A, the filter 330A, the low noise amplifier 230, and the high frequency output terminal 1230. The other of the two first band received signals is transmitted from the antenna 2*b* to the RFIC 3 via the antenna connection terminal 102, the switch 510A, the switch 520A, the filter 310A, the low noise amplifier 210, and the high frequency output terminal 1210.

At this time, the low pass filter 410 suppresses leakage of the first band received signal between the low noise amplifiers 210 and 230, via the supply path of the supply voltage. That is, the interference between the received signal amplified by the low noise amplifier 210 and the received signal amplified by the low noise amplifier 230 is suppressed.

Note that in FIG. 13, instead of the terminal 511, the terminal 512 may be connected to the terminal 514, and instead of the terminal 512, the terminal 511 may be connected to the terminal 516.

2.2.5 Fifth Mode

Figure 14:
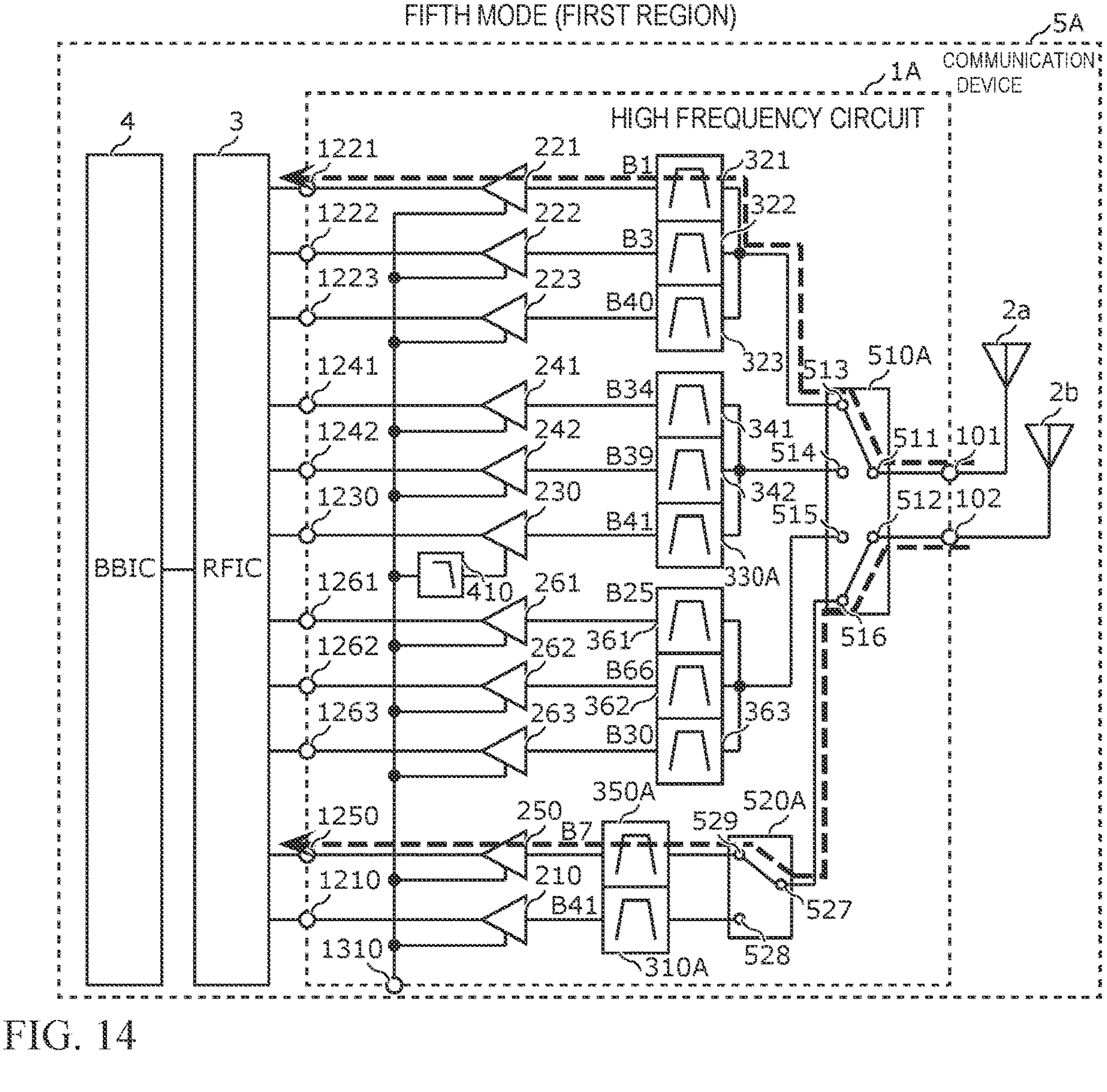
FIG. 14 is a diagram illustrating a connection state and flow of a high frequency signal of the high frequency circuit in a fifth mode according to Embodiment 2.

First, the fifth mode is described with reference to FIG. 14. FIG. 14 is a diagram illustrating a connection state and flow of a high frequency signal of the high frequency circuit 1A in the fifth mode according to the present embodiment. In FIG. 14, the dashed arrows represent the flow of the received signals.

The fifth mode is a communication mode for simultaneously receiving the second band (B1) and fifth band (B7) signals in the first region. As illustrated in FIG. 14, the switch 510A connects the terminal 511 to the terminal 513, and connects the terminal 512 to the terminal 516. Furthermore, the switch 520A connects the terminal 527 to the terminal 529. This connects the filters 321 to 323 to the antenna connection terminal 101, and connects the filter 350A to the antenna connection terminal 102.

As a result, the second band received signal is transmitted from the antenna 2*a* to the RFIC 3 via the antenna connection terminal 101, the switch 510A, the filter 321, the low noise amplifier 221, and the high frequency output terminal 1221. The fifth band received signal is transmitted from the antenna 2*b* to the RFIC 3 via the antenna connection terminal 102, the switch 510A, the switch 520A, the filter 350A, the low noise amplifier 250, and the high frequency output terminal 1250.

Note that in FIG. 14, instead of signals of Band1 for LTE or n1 for 5G NR, signals of Band3 or Band40 for LTE or n3 or n40 for 5G NR may be received. In addition, instead of the terminal 511, the terminal 512 may be connected to the terminal 513, and instead of the terminal 512, the terminal 511 may be connected to the terminal 516.

2.2.6 Sixth Mode

Figure 15:
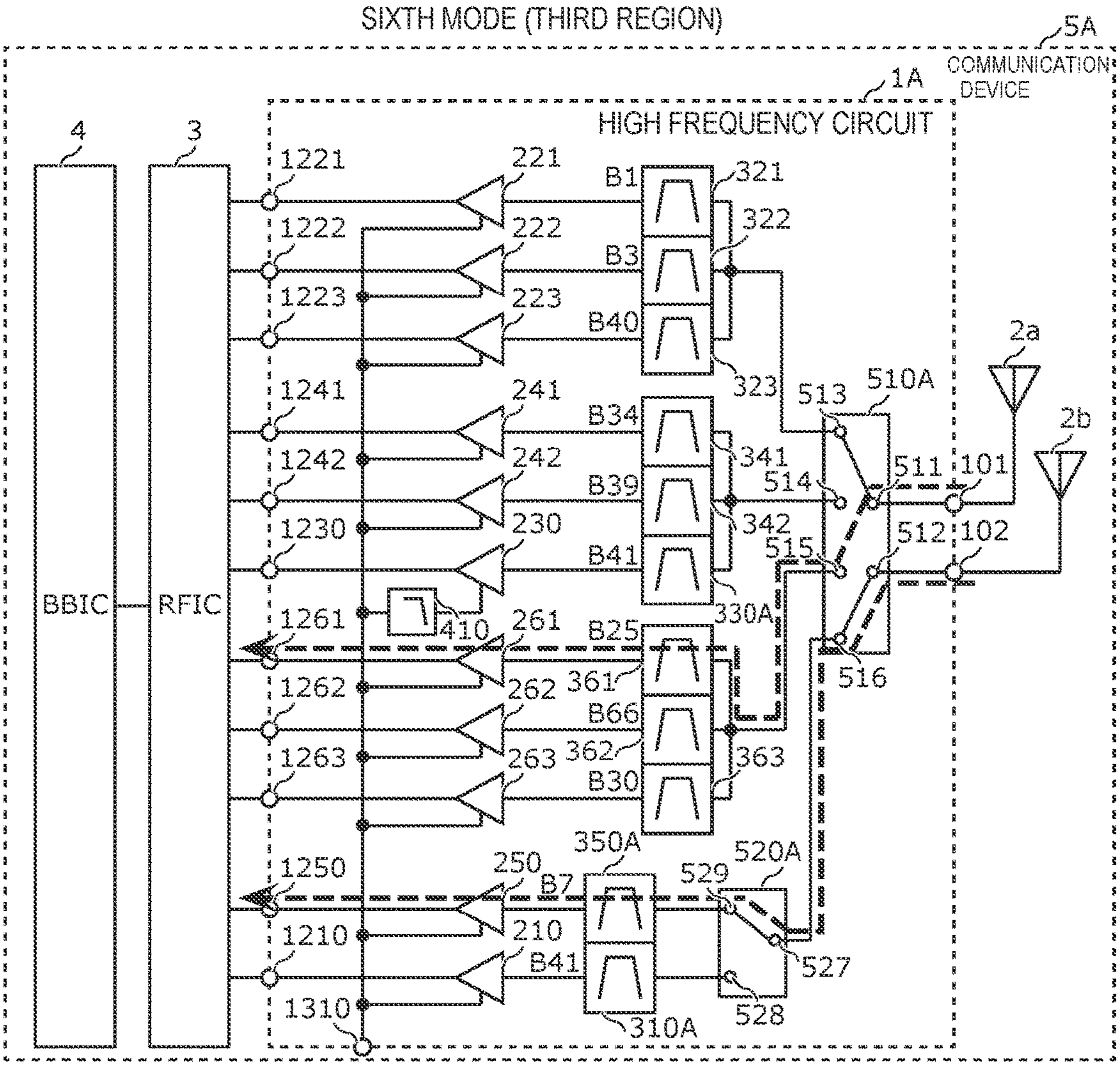
FIG. 15 is a diagram illustrating a connection state and flow of a high frequency signal of the high frequency circuit in a sixth mode according to Embodiment 2.

In the following, the sixth mode is described with reference to FIG. 15. FIG. 15 is a diagram illustrating a connection state and flow of a high frequency signal of the high frequency circuit 1A in the sixth mode according to the present embodiment. In FIG. 15, the dashed arrows represent the flow of the received signals.

The sixth mode is a communication mode for simultaneously receiving the fourth band (B25) and fifth band (B7) signals in the third region. As illustrated in FIG. 15, the switch 510A connects the terminal 511 to the terminal 515, and connects the terminal 512 to the terminal 516. Furthermore, the switch 520A connects the terminal 527 to the terminal 529. This connects the filters 361 to 363 to the antenna connection terminal 101, and connects the filter 350A to the antenna connection terminal 102.

As a result, the fourth band received signal is transmitted from the antenna 2*a* to the RFIC 3 via the antenna connection terminal 101, the switch 510A, the filter 361, the low noise amplifier 261, and the high frequency output terminal 1261. The fifth band received signal is transmitted from the antenna 2*b* to the RFIC 3 via the antenna connection terminal 102, the switch 510A, the switch 520A, the filter 350A, the low noise amplifier 250, and the high frequency output terminal 1250.

Note that in FIG. 15, instead of signals of Band25 for LTE or n25 for 5G NR, signals of Band30 or Band66 for LTE or n30 or n66 for 5G NR may be received. In addition, instead of the terminal 511, the terminal 512 may be connected to the terminal 515, and instead of the terminal 512, the terminal 511 may be connected to the terminal 516.

2.2.7 Summary of Communication Modes

Table 3 below summarizes a relationship between the first mode to the sixth modes described above and the filters and the bands used in the modes.

connected to the filter 310A and the filter 350A; and the switch 520A including the terminal 527 connected to the terminal 516 of the switch 510A, the terminal 528 connected to the filter 310A, and the terminal 529 connected to the filter 350A, the high frequency circuit 1A having the first mode in which in the first region, the terminals 511 and 512 are connected to the terminals 513 and 516, respectively, and the terminal 527 is connected to the terminal 528 to simultaneously receive signals of the first band and the second band; the second mode in which in the second region, the terminal 511 or 512 is connected to the terminal 514 to simultaneously receive signals of the first band and the third band; the third mode in which in the third region, the terminals 511

TABLE 3

| | First filter (310A) | Secondfilter (321-323) | Third filter (330A) | Fourth filter (341-342) | Fifth filter (350A) | Sixth filter (361-363) |
|---|---|---|---|---|---|---|
| First mode (First region) | First band | Second band | — | — | — | — |
| Second mode (Second Region) | — | — | First band | Third band | — | — |
| Third mode (Third region) | First band | — | — | — | — | Fourth band |
| Fourth mode (First to third regions) | First band | — | First band | — | — | — |
| Fifth mode (First region) | — | Second band | — | — | Fifth band | — |
| Sixth mode (Third region) | — | — | — | — | Fifth band | Fourth band |

Note that the first mode to the sixth mode exemplarily illustrate the communication modes for simultaneously receiving two signals, and the communication modes that can be used in the high frequency circuit 1A are not limited to the first mode to the sixth mode. For example, the high frequency circuit 1A may have a communication mode for simultaneously receiving three or more signals. Specifically, the high frequency circuit 1A may have, for example, a communication mode for simultaneously receiving the first band (B41) signal, the second band (B1) signal, and the second band (B3) signal. Such communication modes may be implemented in the same connection state of the first mode. In addition, the high frequency circuit 1A may have, for every band, a communication mode for receiving one signal of one band using one filter.

2.3 Effects, etc.

As described above, the high frequency circuit 1A according to the present embodiment includes the filter 310A that has the passband including the reception band of the first band that can be used in the first region, the second region, and the third region; the filter 321 that has the passband including the reception band of the second band that can be used in the first region; the filter 330A that has the passband including the first band reception band; the filter 341 that has the passband including the reception band of the third band that can be used in the second region; the filter 350A that has the passband including the reception band of the fifth band that can be used in the first region and the third region; the filter 361 that has the passband including the reception band of the fourth band that can be used in the third region; the first switch 510A including the terminal 511 connected to the antenna connection terminal 101, the terminal 512 connected to the antenna connection terminal 102, the terminal 513 connected to the filter 321, the terminal 514 connected to the filter 330A and the filter 341, the terminal 515 connected to the filter 361, and the terminal 516 selectively and 512 are connected to the terminals 515 and 516, respectively, and the terminal 527 is connected to the terminal 528 to simultaneously receive signals of the first band and the fourth band; the fourth band in which in the first region, the second region, and the third region, the terminals 511 and 512 are connected to the terminals 514 and 516, respectively, and the terminal 527 is connected to the terminal 528 to simultaneously receive the two signals of the first band; the fifth mode in which in the first region, the terminals 511 and 512 are connected to the terminals 513 and 516, respectively, and the terminal 527 is connected to the terminal 529 to simultaneously receive the signals of the second band and the fifth band; and the sixth mode in which in the third region, the terminal 511 and 512 are connected to the terminals 515 and 516, respectively, and the terminal 527 is connected to the terminal 529 to simultaneously receive the signals of the fourth band and the fifth band.

According to this, the filter 330A for the first band that can be used in the first region to the third region is connected to the terminal 514 of the switch 510A to which the filter 341 for the third band that can be used in the second region is connected. Therefore, it is possible to reduce the number of terminals of the switch 510A, as compared to a case in which the filter 330A is connected alone to the terminal of the switch 510A. As a result, the parasitic capacitance of the switch 510A can reduced, and the NF in the first mode to the sixth mode can be improved. In the second mode, in particular, it is possible to simultaneously receive the first band and third band signals using the filters 330A and 341 connected to the one terminal 514 of the switch 510A, which is effective for the improvement of the NF. In addition, it is possible to divide the filters for the first band and the fifth band to the two filters 310A and 350A, and characteristics of the filters 310A and 350A (such as pass loss) can be improved as compared with a case in which the adjustable filters are used.

In addition, for example, in the high frequency circuit 1A according to the present embodiment, the fourth mode may be the communication mode for MIMO.

According to this, the high frequency circuit 1A can support simultaneous reception of two signals for MIMO, and, when combined with other high frequency circuits, can support simultaneous reception of four signals or six signals for MIMO.

In addition, for example, in the high frequency circuit 1A according to the present embodiment, the first band may be Band41 for LTE or n41 for 5G NR, the second band may be Band1, Band3, or Band 40 for LTE or n1, n3, or n40 for 5G NR, the third band may be Band34 or Band 39 for LTE or n34 or n39 for 5G NR, the fourth band may be Band25, Band 30, or Band66 for LTE or n25, n30, or n66 for 5G NR, and the fifth band may be Band7 for LTE or n7 for 5G NR.

According to this, it is possible to support reception of signals of bands for LTE and/or 5G NR.

In addition, for example, the high frequency circuit 1A according to the present embodiment may further include the low noise amplifier 210 connected to the filter 310A, the low noise amplifier 230 connected to the filter 330A, the power supply voltage terminal 1310 connected to the low noise amplifiers 210 and 230 and receiving the supply voltage from the outside of the high frequency circuit 1A, and the low pass filter 410 connected between at least one of the low noise amplifier 210 or 230 and the power supply voltage terminal 1310.

According to this, since the low pass filter 410 is connected to the supply path of the supply voltage between the low noise amplifiers 210 and 230, it is possible to enhance isolation between the low noise amplifiers 210 and 230 in the first band. Therefore, leakage of the first band received signal between the low noise amplifiers 210 and 230 via the supply path of the supply voltage is suppressed. As a result, the interference between the received signal amplified by the low noise amplifier 210 and the received signal amplified by the low noise amplifier 230 is suppressed, and the NF can be improved.

In addition, for example, in the high frequency circuit 1A according to the present embodiment, the filters 310A and 330A may be acoustic wave filters and may be mounted in or on the same piezoelectric body.

According to this, it is possible to make the filters 310A and 330A smaller than a case in which the two filters 310A and 330A are mounted on separate piezoelectric bodies, which can contribute to downsizing of the communication device 5A.

The communication device 5A according to the present embodiment includes the RFIC 3 configured to process high frequency signals, and the above-described high frequency circuit 1A configured to transmit high frequency signals between the RFIC 3 and the antennae 2*a* and 2*b*.

According to this, the communication device 5A can achieve similar effects to the high frequency circuit 1A described above.

OTHER EMBODIMENTS

As described above, the high frequency circuits and the communication devices according to one aspect of the present disclosure are described based on the embodiments, but the high frequency circuits and communication devices according to the present disclosure are not limited to the above-described embodiments. The present disclosure also includes other embodiments realized by combining any of the components in the above-described embodiments, modification examples obtained by making various modifications to the above-described embodiments that those skilled in the art can conceive without necessarily departing from the spirit of the present disclosure, or various devices incorporating the above-described high frequency circuits.

For example, in the circuit configuration of the high frequency circuit and the communication device according to each of the above-described embodiments, another circuit element and wiring line or the like may be inserted between paths connecting the respective circuit elements and signal paths disclosed in the drawings. For example, an impedance matching circuit may be inserted between the low noise amplifier and the filter. In addition, for example, an impedance matching circuit may be inserted between the filter and switch. At this time, the impedance matching circuit may include, for example, an inductor and/or a condenser, but is not specifically limited thereto. In addition, for example, a switch may be inserted between the plurality of low noise amplifiers and the plurality of high frequency output terminals. At this time, the number of the plurality of high frequency output terminals may be reduced.

Note that in each of the above-described embodiments, the description has been given of the cases in which the first region, the second region, and the third region are Europe, China, and the United States, respectively, the first region, the second region, and the third region are not limited thereto. For example, the first region, the second region, and the third region may be exchanged mutually. In addition, for example, some or all of the first region, the second region, and the third region may be replaced by another region.

In addition, in each of the above-described embodiments, although the high frequency circuit does not include a transmission path in the embodiments described above, the high frequency circuit may include the transmission path.

<1> A high frequency circuit including:

a first filter that has a passband including a reception band of a first band that is usable in a first region and a second region;

a second filter that has a passband including a reception band of a second band that is usable in the first region;

a third filter that has a passband including the reception band of the first band;

a fourth filter that has a passband including a reception band of a third band that is usable in the second region; and a switch including a first terminal connected to a first antenna connection terminal, a second terminal connected to a second antenna connection terminal, a third terminal connected to a plurality of filters including the first filter and the second filter, and a fourth terminal connected to a plurality of filters including the third filter and the fourth filter, in which the high frequency circuit has a first mode in which in the first region, the first terminal or the second terminal is connected to the third terminal to simultaneously receive signals of the first band and the second band, a second mode in which in the second region, the first terminal or the second terminal is connected to the fourth terminal to simultaneously receive signals of the first band and the third band, and a third mode in which in the first region and the second region, the first terminal and the second terminal are connected to the third terminal and the fourth terminal, respectively, to simultaneously receive two signals of the first band.

<2> The high frequency circuit according to <1>, in which the third mode is a communication mode for multiple-input and multiple-output (MIMO).

<3> The high frequency circuit according to <1> or <2>, in which the first band is Band41 for Long Term Evolution (LTE) or n41 for 5th Generation New Radio (5G NR), the second band is Band1, Band3, or Band 40 for LTE or n1, n3, or n40 for 5G NR, and the third band is Band34 or Band39 for LTE or n34 or n39 for 5G NR.

<4> The high frequency circuit according to any one of <1> to <3>, in which the first band is further usable in the third region, the high frequency circuit further includes:

a fifth filter that has a passband including the reception band of the first band; and a sixth filter that has a passband including a reception band of a fourth band that is usable in the third region, in which the switch further includes a fifth terminal connected to a plurality of filters including the fifth filter and the sixth filter, and the high frequency circuit further has a fourth mode in which in the third region, the first terminal or the second terminal is connected to the fifth terminal to simultaneously receive signals of the first band and the fourth band, and a fifth mode in which in the third region, the first terminal and the second terminal are connected to the fourth terminal and the fifth terminal, respectively, to simultaneously receive two signals of the first band.

<5> The high frequency circuit according to <4>, in which the fifth mode is a communication mode for MIMO.

<6> The high frequency circuit according to <4> or <5>, in which in the fifth mode, when a number of the plurality of filters connected to the fourth terminal is smaller than a number of the plurality of filters connected to the third terminal, the first terminal and the second terminal are connected to the fourth terminal and the fifth terminal, respectively, to simultaneously receive two signals of the first band, and when the number of the plurality of filters connected to the fourth terminal is not smaller than the number of the plurality of filters connected to the third terminal, the first terminal and the second terminal are connected to the third terminal and the fifth terminal, respectively, to simultaneously receive the two signals of the first band.

<7> The high frequency circuit according to any one of <4> to <6>, in which the fourth band is Band25, Band30, or Band66 for LTE or n25, n30, or n66 for 5G NR.

<8> The high frequency circuit according to any one of <4> to <7>, in which each of the first filter and the fifth filter is a filter adjustable to a passband including the first band and a passband including a fifth band that is usable in the first region and the third region, the high frequency circuit further has a sixth mode in which in the first region, the first terminal or the second terminal is connected to the third terminal to simultaneously receive signals of the second band and the fifth band, and a seventh mode in which in the third region, the first terminal or the second terminal is connected to the fifth terminal to simultaneously receive signals of the fourth band and the fifth band, in the first mode and the third mode, the passband of the first filter is adjusted to a passband including the first band, in the sixth mode, the passband of the first filter is adjusted to a passband including the fifth band, in the fourth mode and the fifth mode, the passband of the fifth filter is adjusted to a passband including the first band, and in the seventh mode, the passband of the fifth filter is adjusted to a passband including the fifth band.

<9> The high frequency circuit according to <8>, in which the fifth band is Band7 for LTE or n7 for 5G NR.

<10> The high frequency circuit according to any one of <4> to <9>, in which the third filter is a filter adjustable to a passband including the first band and a passband including a sixth band that is usable in the second region, and in the second mode, the third mode, and the fifth mode, the passband of the third filter is adjusted to a passband including the first band.

<11> The high frequency circuit according to <10>, in which the sixth band is Band53 for LTE or n53 for 5G NR.

<12> The high frequency circuit according to any one of <1> to <11> further including:

a first low noise amplifier connected to the first filter;

a second low noise amplifier connected to the third filter;

a power supply voltage terminal connected to the first low noise amplifier and the second low noise amplifier and receiving a supply voltage from outside of the high frequency circuit; and a low pass filter connected between at least one of the first low noise amplifier or the second low noise amplifier and the power supply voltage terminal.

<13> The high frequency circuit according to any one of <1> to <12>, in which the first filter and the third filter are acoustic wave filters and mounted in or on a same piezoelectric body.

<14> A communication device including:

a signal processing circuit configured to process high frequency signals; and the high frequency circuit according to any one of <1> to <13>, the high frequency circuit configured to transmit high frequency signals between the signal processing circuit and an antenna.

<15> A high frequency circuit including:

a first filter that has a passband including a reception band of a first band that is usable in a first region, a second region, and a third region;

a second filter that has a passband including a reception band of a second band that is usable in the first region;

a third filter that has a passband including the reception band of the first band;

a fourth filter that has a passband including a reception band of a third band that is usable in the second region;

a fifth filter that has a passband including a reception band of a fifth band that is usable in the first region and the third region;

a sixth filter that has a passband including a reception band of a fourth band that is usable in the third region;

a first switch including a first terminal connected to a first antenna connection terminal, a second terminal connected to a second antenna connection terminal, a third terminal connected to the second filter, a fourth terminal connected to the third filter and the fourth filter, a fifth terminal connected to the sixth filter, and a sixth terminal selectively connected to the first filter and the fifth filter; and a second switch including a seventh terminal connected to the sixth terminal of the first switch, an eighth terminal connected to the first filter, and a ninth terminal connected to the fifth filter, in which the high frequency circuit has a first mode in which in the first region, the first terminal and the second terminal are connected to the third terminal and the sixth terminal, respectively, and the seventh terminal is connected to the eighth terminal to simultaneously receive signals of the first band and the second band, a second mode in which in the second region, the first terminal or the second terminal is connected to the fourth terminal to simultaneously receive signals of the first band and the third band, a third mode in which in the third region, the first terminal and the second terminal are connected to the fifth terminal and the sixth terminal, respectively, and the seventh terminal is connected to the eighth terminal to simultaneously receive signals of the first band and the fourth band, a fourth mode in which in the first region, the second region, and the third region, the first terminal and the second terminal are connected to the fourth terminal and the sixth terminal, respectively, and the seventh terminal is connected to the eighth terminal to simultaneously receive two signals of the first band, a fifth mode in which in the first region, the first terminal and the second terminal are connected to the third terminal and the sixth terminal, respectively, and the seventh terminal is connected to the ninth terminal to simultaneously receive signals of the second band and the fifth band, and a sixth mode in which in the third region, the first terminal and the second terminal are connected to the fifth terminal and the sixth terminal, respectively, and the seventh terminal is connected to the ninth terminal to simultaneously receive signals of the fourth band and the fifth band.

<16> The high frequency circuit according to <15>, in which the fourth mode is a communication mode for MIMO.

<17> The high frequency circuit according to <15> or <16>, in which the first band is Band41 for LTE or n41 for 5G NR, the second band is Band1, Band3, or Band40 for LTE or n1, n3, or n40 for 5G NR, the third band is Band34 or Band39 for LTE or n34 or n39 for 5G NR, the fourth band is Band25, Band30, or Band66 for LTE or n25, n30, or n66 for 5G NR, and the fifth band is Band7 for LTE or n7 for 5G NR.

<18> The high frequency circuit according to any one of <15> to <17>, further including:

a first low noise amplifier connected to the first filter;

a second low noise amplifier connected to the third filter;

a power supply voltage terminal connected to the first low noise amplifier and the second low noise amplifier and receiving a supply voltage from outside of the high frequency circuit; and a low pass filter connected between at least one of the first low noise amplifier or the second low noise amplifier and the power supply voltage terminal.

<19> The high frequency circuit according to any one of <15> to <18>, in which the first filter and the third filter are acoustic wave filters and mounted in or on a same piezoelectric body.

<20> A communication device including:

a signal processing circuit configured to process high frequency signals; and the high frequency circuit according to any one of <15> to <19>, the high frequency circuit configured to transmit high frequency signals between the signal processing circuit and an antenna.

The present disclosure can be widely used in communication devices such as mobile phones, as a high frequency circuit disposed in a front end section.

What is claimed is:

1. A high frequency circuit comprising:

a first filter that has a passband comprising a reception band of a first band that is usable in a first geographic region and a second geographic region;

a second filter that has a passband comprising a reception band of a second band that is usable in the first geographic region;

a third filter that has a passband comprising the reception band of the first band;

a fourth filter that has a passband comprising a reception band of a third band that is usable in the second geographic region; and a switch having a first terminal connected to a first antenna connection terminal, a second terminal connected to a second antenna connection terminal, a third terminal connected to the first filter and the second filter, and a fourth terminal connected to the third filter and the fourth filter, wherein the high frequency circuit has:

a first mode in which in the first geographic region, the first terminal or the second terminal is connected to the third terminal such that the high frequency circuit is configured to simultaneously receive signals of the first band through the first filter and the second band through the second filter, a second mode in which in the second geographic region, the first terminal or the second terminal is connected to the fourth terminal such that the high frequency circuit is configured simultaneously receive signals of the first band through the third filter and the third band through the fourth filter, and a third mode in which in the first geographic region and the second geographic region, the first terminal and the second terminal are connected to the third terminal and the fourth terminal, respectively, such that the high frequency circuit is configured to simultaneously receive two signals of the first band through the first filter and the third filter.

2. The high frequency circuit according to claim 1, wherein the third mode is a communication mode for multiple-input and multiple-output (MIMO).

3. The high frequency circuit according to claim 1, wherein the first band is Band41 for Long Term Evolution (LTE) or n41 for 5th Generation New Radio (5G NR), wherein the second band is Band1, Band3, or Band 40 for LTE or n1, n3, or n40 for 5G NR, and wherein the third band is Band34 or Band39 for LTE or n34 or n39 for 5G NR.

4. The high frequency circuit according to claim 1, wherein the first band is further usable in the third geographic region, wherein the high frequency circuit further comprises:

a fifth filter that has a passband comprising the reception band of the first band; and a sixth filter that has a passband comprising a reception band of a fourth band that is usable in the third geographic region, wherein the switch further includes a fifth terminal connected to a plurality of filters including the fifth filter and the sixth filter, and wherein the high frequency circuit further has:

a fourth mode in which in the third geographic region, the first terminal or the second terminal is connected to the fifth terminal such that the high frequency circuit is configured to simultaneously receive signals of the first band and the fourth band, and a fifth mode in which in the third geographic region, the first terminal and the second terminal are connected to the fourth terminal and the fifth terminal, respectively, such that the high frequency circuit is configured to simultaneously receive two signals of the first band.

5. The high frequency circuit according to claim 4, wherein the fifth mode is a communication mode for multiple-input and multiple-output (MIMO).

6. The high frequency circuit according to claim 4, wherein in the fifth mode:

when a number of filters connected to the fourth terminal is smaller than a number of filters connected to the third terminal, the first terminal and the second terminal are connected to the fourth terminal and the fifth terminal, respectively, such that the high frequency circuit is configured to simultaneously receive two signals of the first band, and when the number of filters connected to the fourth terminal is not smaller than the number of filters connected to the third terminal, the first terminal and the second terminal are connected to the third terminal and the fifth terminal, respectively, such that the high frequency circuit is configured to simultaneously receive the two signals of the first band.

7. The high frequency circuit according to claim 4, wherein the fourth band is Band25, Band30, or Band66 for Long Term Evolution (LTE) or n25, n30, or n66 for 5th Generation New Radio (5G NR).

8. The high frequency circuit according to claim 4, wherein each of the first filter and the fifth filter is a filter adjustable to a passband comprising the first band and a passband comprising a fifth band that is usable in the first geographic region and the third geographic region, the high frequency circuit further has:

a sixth mode in which in the first geographic region, the first terminal or the second terminal is connected to the third terminal such that the high frequency circuit is configured to simultaneously receive signals of the second band and the fifth band, and a seventh mode in which in the third geographic region, the first terminal or the second terminal is connected to the fifth terminal to simultaneously receive signals of the fourth band and the fifth band, wherein in the first mode and the third mode, the passband of the first filter is adjusted to a passband comprising the first band, wherein in the sixth mode, the passband of the first filter is adjusted to a passband comprising the fifth band, wherein in the fourth mode and the fifth mode, the passband of the fifth filter is adjusted to a passband comprising the first band, and in the seventh mode, the passband of the fifth filter is adjusted to a passband comprising the fifth band.

9. The high frequency circuit according to claim 8, wherein the fifth band is Band7 for Long Term Evolution (LTE) or n7 for 5th Generation New Radio (5G NR).

10. The high frequency circuit according to claim 4, wherein the third filter is a filter adjustable to a passband comprising the first band and a passband comprising a sixth band that is usable in the second geographic region, and wherein in the second mode, the third mode, and the fifth mode, the passband of the third filter is adjusted to a passband comprising the first band.

11. The high frequency circuit according to claim 10, wherein the sixth band is Band53 for Long Term Evolution (LTE) or n53 for 5th Generation New Radio (5G NR).

12. The high frequency circuit according to claim 1, further comprising:

a first low noise amplifier connected to the first filter;

a second low noise amplifier connected to the third filter;

a power supply voltage terminal connected to the first low noise amplifier and the second low noise amplifier, and configured to receive a supply voltage from outside of the high frequency circuit; and a low pass filter connected between the first low noise amplifier or the second low noise amplifier, and the power supply voltage terminal.

13. The high frequency circuit according to claim 1, wherein the first filter and the third filter are acoustic wave filters, and are mounted in or on a same piezoelectric body.

14. A communication device comprising:

a signal processing circuit configured to process high frequency signals; and the frequency circuit according to claim 1, the high frequency circuit being configured to transmit the high frequency signals between the signal processing circuit and an antenna.

15. A high frequency circuit comprising:

a first filter that has a passband comprising a reception band of a first band that is usable in a first geographic region, a second geographic region, and a third geographic region;

a second filter that has a passband comprising a reception band of a second band that is usable in the first geographic region;

a third filter that has a passband comprising the reception band of the first band;

a fourth filter that has a passband comprising a reception band of a third band that is usable in the second geographic region;

a fifth filter that has a passband comprising a reception band of a fifth band that is usable in the first geographic region and the third geographic region;

a sixth filter that has a passband comprising a reception band of a fourth band that is usable in the third geographic region;

a first switch having a first terminal connected to a first antenna connection terminal, a second terminal connected to a second antenna connection terminal, a third terminal connected to the second filter, a fourth terminal connected to the third filter and the fourth filter, a fifth terminal connected to the sixth filter, and a sixth terminal selectively connected to the first filter and the fifth filter; and a second switch having a seventh terminal connected to the sixth terminal of the first switch, an eighth terminal connected to the first filter, and a ninth terminal connected to the fifth filter, wherein the high frequency circuit has:

a first mode in which in the first geographic region, the first terminal and the second terminal are connected to the third terminal and the sixth terminal, respectively, and the seventh terminal is connected to the eighth terminal such that the high frequency circuit is configure to simultaneously receive signals of the first band and the second band, a second mode in which in the second geographic region, the first terminal or the second terminal is connected to the fourth terminal such that the high frequency circuit is configure to simultaneously receive signals of the first band and the third band, a third mode in which in the third geographic region, the first terminal and the second terminal are connected to the fifth terminal and the sixth terminal, respectively, and the seventh terminal is connected to the eighth terminal, such that the high frequency circuit is configure to simultaneously receive signals of the first band and the fourth band, a fourth mode in which in the first geographic region, the second geographic region, and the third geographic region, the first terminal and the second terminal are connected to the fourth terminal and the sixth terminal, respectively, and the seventh terminal is connected to the eighth terminal, such that the high frequency circuit is configure to simultaneously receive two signals of the first band, a fifth mode in which in the first geographic region, the first terminal and the second terminal are connected to the third terminal and the sixth terminal, respectively, and the seventh terminal is connected to the ninth terminal, such that the high frequency circuit is configure to simultaneously receive signals of the second band and the fifth band, and a sixth mode in which in the third geographic region, the first terminal and the second terminal are connected to the fifth terminal and the sixth terminal, respectively, and the seventh terminal is connected to the ninth terminal, such that the high frequency circuit is configure to simultaneously receive signals of the fourth band and the fifth band.

16. The high frequency circuit according to claim 15, wherein the fourth mode is a communication mode for multiple-input and multiple-output (MIMO).

17. The high frequency circuit according to claim 15, wherein the first band is Band41 for Long Term Evolution (LTE) or n41 for 5th Generation New Radio (5G NR), wherein the second band is Band1, Band3, or Band40 for LTE or n1, n3, or n40 for 5G NR, wherein the third band is Band34 or Band39 for LTE or n34 or n39 for 5G NR, wherein the fourth band is Band25, Band30, or Band66 for LTE or n25, n30, or n66 for 5G NR, and wherein the fifth band is Band7 for LTE or n7 for 5G NR.

18. The high frequency circuit according to claim 15, further comprising:

a first low noise amplifier connected to the first filter;

a second low noise amplifier connected to the third filter;

a power supply voltage terminal connected to the first low noise amplifier and the second low noise amplifier, and configured to receive a supply voltage from outside of the high frequency circuit; and a low pass filter connected between the first low noise amplifier or the second low noise amplifier, and the power supply voltage terminal.

19. The high frequency circuit according to claim 15, wherein the first filter and the third filter are acoustic wave filters, and are mounted in or on a same piezoelectric body.

20. A communication device comprising:

a signal processing circuit configured to process high frequency signals; and the high frequency circuit according to claim 15, the high frequency circuit being configured to transmit the high frequency signals between the signal processing circuit and an antenna.

* * * * *